US009098544B2

(12) United States Patent  (10) Patent No.: US 9,098,544 B2
Dalvi et al.  (45) Date of Patent: *Aug. 4, 2015

(54) LIFECYCLE MARKETING OBJECT ORIENTED SYSTEM AND METHOD

(71) Applicant: Right On Interactive, Indianapolis, IN (US)

(72) Inventors: Amol A. Dalvi, Fishers, IN (US); Stephen T. Burk, Indianapolis, IN (US)

(73) Assignee: Right On Interactive, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/911,158

(22) Filed: Jun. 6, 2013

(65) Prior Publication Data

US 2013/0275366 A1    Oct. 17, 2013

Related U.S. Application Data

(63) Continuation of application No. 13/007,092, filed on Jan. 14, 2001, now Pat. No. 8,468,123.

(60) Provisional application No. 61/295,812, filed on Jan. 18, 2010.

(51) Int. Cl.
G06F 17/30    (2006.01)
G06Q 30/02    (2012.01)

(52) U.S. Cl.
CPC .......... *G06F 17/30377* (2013.01); *G06Q 30/02* (2013.01)

(58) Field of Classification Search
CPC ... G06F 21/552; G06F 11/3442; G06Q 30/02; G06Q 10/06; G06Q 10/063; G06Q 10/0631; G06Q 10/087; G06Q 30/0201; G06Q 10/067; G06Q 10/06375; G06Q 10/06393; G06Q 10/0639; G06Q 10/103
USPC ............. 705/35, 36 R, 7.29, 7.11, 7.12, 7.23, 705/7.37, 7.39, 7.28, 7.36, 7.38; 707/999.102, 600, 744; 715/744, 765, 715/811
See application file for complete search history.

(56) References Cited

U.S. PATENT DOCUMENTS

| 6,519,571 | B1 * | 2/2003 | Guheen et al. ............. 705/14.66 |
| 7,315,826 | B1 * | 1/2008 | Guheen et al. ............... 705/7.29 |
| 7,406,436 | B1 * | 7/2008 | Reisman ...................... 705/7.32 |
| 2002/0042731 | A1 * | 4/2002 | King et al. ...................... 705/10 |
| 2002/0178077 | A1 * | 11/2002 | Katz et al. ....................... 705/26 |
| 2003/0033179 | A1 * | 2/2003 | Katz et al. .......................... 705/7 |
| 2003/0217332 | A1 * | 11/2003 | Smith et al. ................... 715/513 |
| 2004/0162741 | A1 * | 8/2004 | Flaxer et al. ...................... 705/7 |
| 2005/0055308 | A1 * | 3/2005 | Meyer et al. ..................... 705/38 |
| 2007/0283287 | A1 * | 12/2007 | Taylor et al. ................... 715/769 |
| 2008/0091774 | A1 * | 4/2008 | Taylor et al. ................... 709/203 |
| 2008/0222630 | A1 * | 9/2008 | Taylor et al. ................... 717/176 |
| 2011/0179067 | A1 * | 7/2011 | Dalvi et al. .................... 707/769 |

* cited by examiner

*Primary Examiner* — Dennis Truong
(74) *Attorney, Agent, or Firm* — Faegre Baker Daniels LLP

(57) ABSTRACT

The present invention involves a server for providing remote users a Lifecycle marketing system based on information in a data store of the customer enterprise. The server includes a database storing customer enterprise data. The customer enterprise data includes rules, criteria, and stages. Query software is capable of accessing data in enterprise data stores. Lifecycle definition software accesses the database and is capable of creating a lifecycle framework in the database based on information on contacts included in the enterprise data stores.

16 Claims, 23 Drawing Sheets

FIG. 4B

Tables

| Name | Description | Created | Created By | Last Modified | Last Modified By | Actions |
|---|---|---|---|---|---|---|
| Contacts | Contacts | 5/14/2010 10:34:32 PM | ArnoID | 10/15/2010 12:42:06 PM | ArnoID | |
| AssetHistory | Asset amount over time | 10/15/2010 10:19:34 AM | ArnoID | 10/15/2010 10:10:34 AM | ArnoID | |
| FourSquareVenue | foursquare Venues | 8/23/2010 10:49:41 PM | Default Account Admin of FrontOfficePlus CLM | 8/23/2010 10:49:41 PM | Default Account Admin of FrontOfficePlus CLM | |
| Company | Company | 5/14/2010 10:34:32 PM | ArnoID | 5/23/2010 1:23:41 PM | ArnoID | |
| ContactsByStage | Contacts and Stages | 5/14/2010 10:34:33 PM | Default Account Admin of FrontOfficePlus CLM | 5/14/2010 10:34:33 PM | Default Account Admin of FrontOfficePlus CLM | |
| Events | Events Tracking | 5/14/2010 10:34:32 PM | Default Account Admin of FrontOfficePlus CLM | 5/14/2010 10:34:32 PM | Default Account Admin of FrontOfficePlus CLM | |

|  | Ideal score | Send | Open | Click | Bounce | Unsubscribe |
|---|---|---|---|---|---|---|
| Email | 5 | 0 | 1 | 4 | -5 | -5 |

|  | Ideal score | Invited | Registered | Attended |
|---|---|---|---|---|
| Webinar | 7 | 0 | 2 | 5 |

| | | | 1008 |
|---|---|---|---|
| Max Possible Score: 155 | | | |
| 1001 [+][≡] Title | 1006 | 1007 | Default Score: -10 |
| Actions | Criteria Name | Profile Score | Created By | Last Modified By |
| [/][≡] | CEO | 30 | AmoID | AmoID |
| [/][≡] | Director | 20 | AmoID | AmoID |
| [/][≡] | Manager | 10 | AmoID | AmoID |

| 1002 [+][≡] Industry | | | Default Score: 5 |
|---|---|---|---|
| Actions | Criteria Name | Profile Score | Created By | Last Modified By |
| [/][≡] | Software | 30 | AmoID | AmoID |
| [/][≡] | Travel | 20 | AmoID | AmoID |
| [/][≡] | Manufacturing | 10 | AmoID | AmoID |

| 1003 [+][≡] Annual Revenue | | | Default Score: -10 |
|---|---|---|---|
| Actions | Criteria Name | Profile Score | Created By | Last Modified By |
| [/][≡] | $10MM - $49MM | 10 | AmoID | AmoID |
| [/][≡] | $50MM - $100MM | 40 | AmoID | AmoID |
| [/][≡] | $100MM + | 60 | AmoID | AmoID |

| 1004 [+][≡] Age | | | Default Score: 0 |
|---|---|---|---|
| Actions | Criteria Name | Profile Score | Created By | Last Modified By |

| 1005 [+][≡] Dealer Type | | | Default Score: 0 |
|---|---|---|---|
| Actions | Criteria Name | Profile Score | Created By | Last Modified By |
| [/][≡] | Franchise | 35 | AmoID | AmoID |

1100 — Stages | Engagement Score | Profile Score

Engagement Score and Activity Score are based off of the last 90 days activity.

EMAIL 1101
Target Score: 7

- SentEvent: 1 ☐ Response
- OpenEvent: 1 ☑ Response
- ClickEvent: 5 ☑ Response
- BounceEvent: -1 ☐ Response
- UnsubEvent: -7 ☐ Response

Twitter 1102
Target Score: 20

- Follower: 5 ☐ Response
- TweetSent: 5 ☑ Response
- Retweet: 5 ☐ Response
- DirectMessage: 5 ☐ Response

WEBINAR 1103
Target Score: 10

- SentEvent: 1 ☐ Response
- Register: 2 ☐ Response
- Attend: 7 ☐ Response

FourSquare 1104
Target Score: 3

- Friend: 1 ☐ Response
- CheckIns: 2 ☐ Response

Facebook 1105
Target Score: 3

- Fan: 2 ☐ Response
- Like: 1 ☐ Response

SalesActivity 1106
Target Score: 20

- CompletedCall: 5 ☐ Response
- FaceToFace: 10 ☑ Response
- Networking: 5 ☐ Response

LIFECYCLE MARKETING OBJECT ORIENTED SYSTEM AND METHOD

CROSS REFERENCE TO RELATED APPLICATION

This application is a continuation of U.S. patent application Ser. No. 13/007,092, filed Jan. 14, 2011; which claims priority from U.S. Provisional Patent Application Ser. No. 61/295,812, entitled "LIFECYCLE MARKETING OBJECT ORIENTED SYSTEM AND METHOD," filed Jan. 18, 2010, the disclosures of which are hereby expressly incorporated by reference herein in their entirety.

BACKGROUND OF THE INVENTION

1. Field of the Invention

The invention relates to Customer Lifecycle marketing software.

2. Description of the Related Art

Every Company has prospects and customers, collectively referred to as "Contacts". Each Company goes through a well defined set of relationship stages with their Contacts. Contacts typically start off as a sales lead and then move through a series of stages until they become Customers; at which point they again move through a series of stages before they become Brand Advocates. The goal of every Company's marketing organization, and the entire Company, is to move the Contact from Lead to Brand Advocate.

The software has been developed to assist organizations with managing its online and offline communications with Contacts. Every business has its own way of segmenting Contacts into phases of the relationship Lifecycle. Broadly, these include lead engagement and customer engagement. The former focuses on engaging prospects, the latter on retaining and growing existing customers. However, because of the unique aspects of every business, generic marketing software often fails to account for those differences.

SUMMARY OF THE INVENTION

The present invention is a customer Lifecycle system and method which allows for a business to create company specific Lifecycle marketing software. A server includes a database storing customer enterprise data including rules, criteria, and stages. Query software is on the server capable of accessing data in enterprise data stores. The lifecycle definition software accesses the database and is capable of creating a life cycle framework in the database based on information on contacts included in the enterprise data stores.

In marketing, statistics reveal that it usually takes between four and seven "touches" before a contact will respond to an offer. Yet, many companies communicate only once or twice before abandoning a lead. Implementing an automated nurturing program includes three interrelated elements.

The first element defines the program, campaigns & tactics. Each nurturing program consists of one or more campaigns that are sequenced, triggered and scheduled according to the campaign design. A nurturing program might consist of two campaigns. For example, a weight loss surgery firm has two types of leads they nurture: those that have had a personal consultation, but haven't made a decision, and those who have not yet requested a consultation. The first campaign targets the segment of prospective clients who have had a consultation. It includes a series of email marketing tactics which provide informational articles that address common fears and objections to moving forward with the surgery. The second campaign targets the remaining segment. It includes two tactics: a telephone touch and a monthly email newsletter discussing nutrition, exercise, and inspirational success stories of others who have had the surgery. The primary call to action in this campaign is to schedule the personal consultation.

The second element defines the target audiences, those to whom the message is directed, as discussed earlier. Each nurturing program and campaign targets segments of individuals or households. Each person is placed in a segment based on attributes such as behavior, demographic data, action, time since last action, or an engagement score, among others.

The third element defines treatments and offers for each step in each campaign. A treatment is the physical or electronic communication a person receives. An offer compels the recipient to action. The members of each bucket might receive a different mix of treatments and offers depending on their attributes. The objective of each is to move prospective Contacts forward in the Lifecycle.

According to one embodiment of the invention, the system allows a marketer to graphically build a flow chart for each nurturing campaign. The marketer may (1) Define the Stages/Gate Criteria; (2) Define the Profile desired in Contacts, (3) Specify Programs, Campaigns, Tactics to use; (4) Define Segments (based on 1 and 2); and specify Treatments (relevancy). This is an excellent planning and communication tool to align every stakeholder's understanding.

The invention allows user to diagram each step, decision branch, and the timing of the campaign. The flow chart here illustrates a decision branch where a lead does one of three things: they do not respond in any way; they click an event registration link, but do not register; or they click-thru and register for the event. Those who do not click anything receive the next communication 10-days from now. Those that click but don't register receive a second communication in 3-days. Those that register receive an immediate confirmation email and a link to a free gift.

Implementing a customer Lifecycle communications strategy requires insight, planning, and a commitment to continuous improvement. Many marketers find the initial transition process daunting. The system makes it possible for marketers to implement their Lifecycle Marketing, providing a framework as a starting point. The system allows a user to setup three interrelated elements in the planning process.

The first element defines the customer Lifecycle marketing programs. These are the broad marketing programs that relate to the stages of the customer Lifecycle. For example, one of the programs in an Adopt stage might include a customer on-boarding program. The goal of an on-boarding program might be to ensure each new customer begins using the new product within a short time window.

The first element further defines the customer Lifecycle campaigns & tactics for each marketing program. Each Lifecycle marketing program consists of one or more campaigns that are sequenced, triggered and scheduled according to the campaign design. These campaigns could be a mix of single-step, multi-step, and drip campaigns. For example, the customer on-boarding marketing program might consist of two campaigns—first, a multi-step welcome campaign that consists of a letter, a welcome kit, and, if the customer has been dormant for more than 60-days, a scheduled phone call; and second, a quarterly drip campaign delivering a printed newsletter. These campaigns might run in parallel, or sequentially, depending on the campaign design.

The second element defines the target audiences, those to whom the message is directed. These are customer Lifecycle buckets. Each Lifecycle program and campaign targets a set of buckets or segments of individuals or households. Each person is placed in a bucket based on attributes such as behavior, demographic data, action, time, or lead score, among others. For example, the target audience of the customer on-boarding program is customers who have purchased within the last seven days. They are further segmented in three buckets based on number of employees—fewer than 100; 100-999; and 1000+.

The third element defines treatments and offers for each step in each campaign. A treatment is the physical or electronic communication a person receives. An offer compels the recipient to action. The members of each bucket might receive a different mix of treatments and offers depending on their attributes. The objective of each is to optimize moving the constituents forward in the Lifecycle. For example, during the on-boarding program, customers in bucket one may receive one set of content in the welcome kit, including resources for small businesses and a request to log-in to their new account. The welcome kit content going to customers in bucket three (1000+ employees) may include additional promotional pieces and a request to complete an online profile.

Lead scoring enables organizations to send higher quality leads to the sales team. A leading Sales and marketing consultancy reports that in organizations with best-in-class lead management processes, three-quarters of marketing qualified leads (MQLs) are accepted by the sales team as work in process. The average organization accepts just over half of MQLs.

In order to achieve best-in-class performance, marketing groups must reach consensus with its sales team on what constitutes a sales-ready lead. Similarly it must reach consensus with its customer service, account management as well at the sales team on what constitutes a satisfied customer that can considered a brand advocate. The inventive system allows marketing organizations to collaborate with company leadership to establish a scoring methodology.

The present invention, in one form, relates to a server for providing remote users a customer Lifecycle management system based on information in a data store of the customer enterprise. The server includes a database storing customer enterprise data, including rules, criteria, and stages. Query software is capable of accessing data in enterprise data stores. Life cycle definition software accesses the database and is capable of creating a life cycle framework in the database based on information on contacts included in the enterprise data stores.

The present invention, in another form, is a method for providing a customer Lifecycle marketing system based on information in a data store of the customer enterprise. A user interface is provided over a remote access communication, with the user interface enabling the user to enter customer enterprise data. The enterprise data stores are queried regarding customer enterprise data. A lifecycle framework is created based on the customer enterprise data and the results of the querying step. The present invention, in another form, is a machine-readable program storage device for storing encoded instructions for a method of using a computer to provide remote users a Lifecycle marking system based on information in a data store of customer enterprise, the method including the steps of the method described above.

Further aspects of the present invention involve a user interaction module for allowing the user to enter rules for profile scoring of contacts of a customer, entering rules for engagement scoring of contacts of a customer, allowing the user to enter gate criteria relating to stages of the life cycle framework, allowing the user to enter stage definitions relating to the life cycle framework. The database includes rules, criteria, and stages of a plurality of customer enterprises. The lifecycle definition software is capable of separating customer enterprise data in the database and restricting access to each of the plurality of customer enterprises. The query software is capable of dynamically constructing queries of the enterprise data stores based on those rules, and dynamically constructing SQL queries. The lifecycle definition software includes a history table for storing frameworks in the database. The query software stores at least some of the results of queries in the history table.

Another aspect of the invention relates to a machine-readable program storage device for storing encoded instructions for performing the foregoing method.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIGS. 4A-C are partial screen shot diagrams of an embodiment of the present invention relating to user interaction with data tables;

FIGS. 4D-4F are partial screen shot diagrams of an alternative embodiment of the present invention relating to user interaction with data tables;

FIG. 6 is a table illustrating the scoring of a Engagement Score™ of a Contact for two different communication devices, the scoring based on the actions associated with each communication device used;

FIGS. 8A and 8B are partial screen shot diagrams of an embodiment of the present invention relating to user interaction with creating or editing segments for selection on the Lifecycle Map™ marketing chart of FIGS. 7A and 7B;

FIG. 10 is a partial screen shot diagram of an embodiment of the present invention relating to a business rules setup for defining the Profile Score™ of a Contact;

FIG. 11 is a partial screen shot diagram of an embodiment of the present invention relating to a business rules setup for defining the Engagement Score™ of a Contact;

Figure 1:
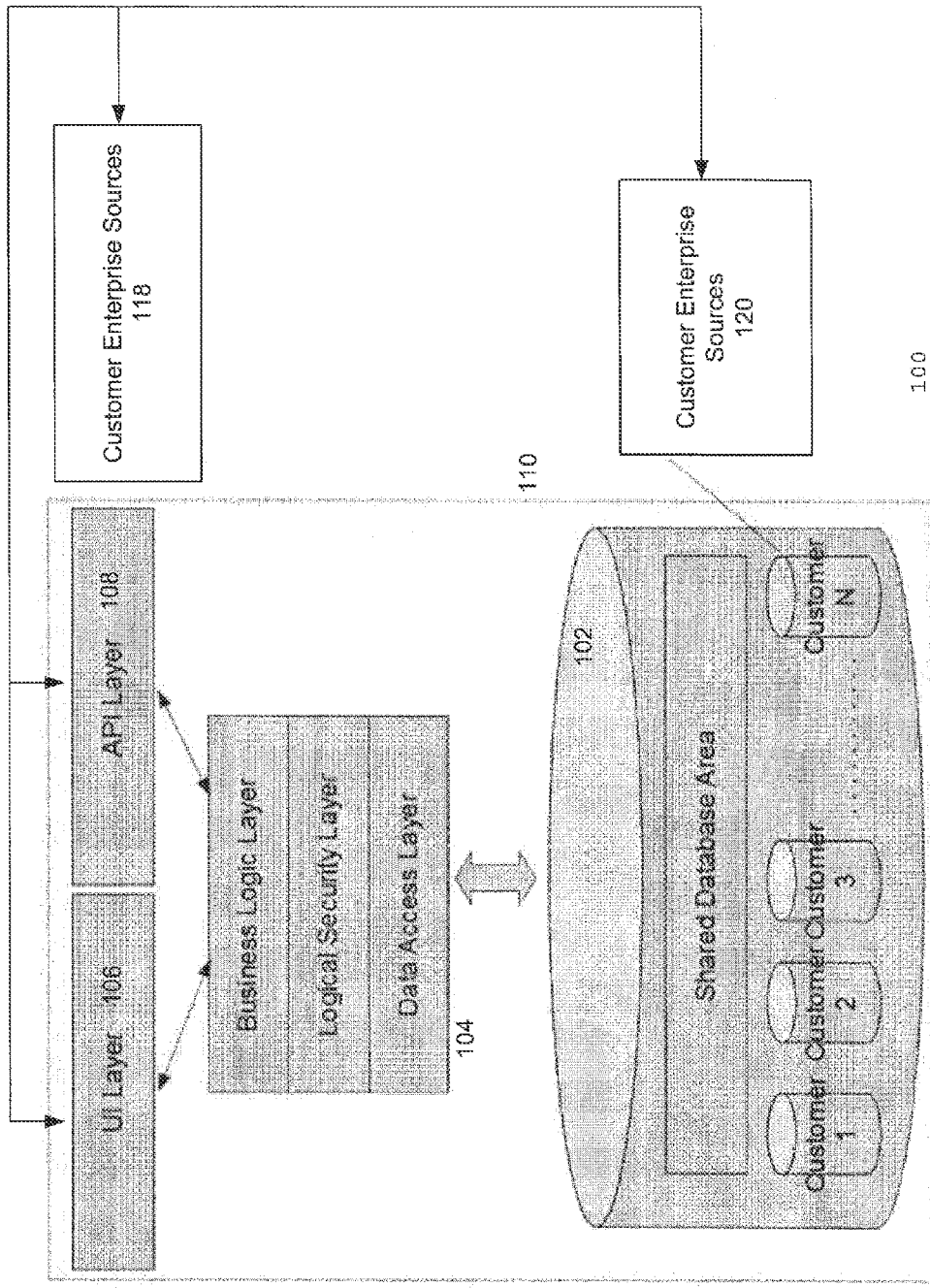
FIG. 1 is a schematic diagrammatic view of an embodiment of a Lifecycle marketing system using the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The detailed descriptions which follow are presented in part in terms of algorithms and symbolic representations of operations on data bits within a computer memory representing alphanumeric characters or other information. A computer generally includes a processor for executing instructions and memory for storing instructions and data. When a general purpose computer has a series of machine encoded instructions stored in its memory, the computer operating on such encoded instructions may become a specific type of machine, namely a computer particularly configured to perform the operations embodied by the series of instructions. Some of the instructions may be adapted to produce signals that control operation of other machines and thus may operate through those control signals to transform materials far removed from the computer itself. These descriptions and representations are the means used by those skilled in the art of data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself rather as a result of a instruction.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus unless explicitly indicated as requiring particular hardware. In some cases, the computer programs may communicate or relate to other programs or equipments through signals configured to particular protocols which may or may not require specific hardware or programming to interact. In particular, various general purpose machines may be used with programs written in accordance with the teachings herein, or it may prove more convenient to construct more specialized apparatus to perform the required method steps. The required structure for a variety of these machines will appear from the description below.

The present invention may deal with "object oriented" software, and particularly with an "object oriented" operating system. The "object oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object oriented system is inheritance. For example, an object for drawing a "circle" on a display may inherit functions and knowledge from another object for drawing a "shape" on a display.

A programmer "programs" in an object oriented programming language by writing individual blocks of code each of which creates an object by defining its methods. A collection of such objects adapted to communicate with one another by means of messages comprises an object oriented program. Object oriented computer programming facilitates the modeling of interactive systems in that each component of the system can be modeled with an object, the behavior of each component being simulated by the methods of its corresponding object, and the interactions between components being simulated by messages transmitted between objects.

An operator may stimulate a collection of interrelated objects comprising an object oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object oriented programming makes simulation of systems of interrelated components more intuitive, the operation of an object oriented program is often difficult to understand because the sequence of operations carried out by an object oriented program is usually not immediately apparent from a software listing as in the case for sequentially organized programs. Nor is it easy to determine how an object oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter workstation communication. Users activate computer programs or network resources to create "processes" which include both the general operation of the computer program along with specific operating characteristics determined by input variables and its environment. Similar to a process is an agent (sometimes called an intelligent agent), which is a process that gathers information or performs some other service without user intervention and on some regular schedule. Typically, an agent, using parameters typically provided by the user, searches locations either on the host machine or at some other point on a network, gathers the information relevant to the purpose of the agent, and presents it to the user on a periodic basis.

The term "desktop" means a specific user interface which presents a menu or display of objects with associated settings for the user associated with the desktop. When the desktop accesses a network resource, which typically requires an application program to execute on the remote server, the desktop calls an Application Program Interface, or "API", to allow the user to provide commands to the network resource and observe any output. The term "Browser" refers to a program which is not necessarily apparent to the user, but which is responsible for transmitting messages between the desktop and the network server and for displaying and interacting with the network user. Browsers are designed to utilize a communications protocol for transmission of text and graphic information over a world wide network of computers, namely the "World Wide Web" or simply the "Web". Examples of Browsers compatible with the present invention include the Internet Explorer program sold by Microsoft Corporation (Internet Explorer is a trademark of Microsoft Corporation), the Opera Browser program created by Opera Software ASA, or the Firefox browser program distributed by the Mozilla Foundation (Firefox is a registered trademark of the Mozilla Foundation). Although the following description details such operations in terms of a graphic user interface of a Browser, the present invention may be practiced with text based interfaces, or even with voice or visually activated interfaces, that have many of the functions of a graphic based Browser.

Browsers display information which is formatted in a Standard Generalized Markup Language ("SGML") or a HyperText Markup Language ("HTML"), both being scripting languages which embed non visual codes in a text document through the use of special ASCII text codes. Files in these formats may be easily transmitted across computer networks, including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method).

The terms "personal digital assistant" or "PDA", as defined above, means any handheld, mobile device that combines computing, telephone, fax, e-mail and networking features. The terms "wireless wide area network" or "WWAN" mean a wireless network that serves as the medium for the transmission of data between a handheld device and a computer. The term "synchronization" means the exchanging of information between a first device, e.g. a handheld device, and a second device, e.g. a desktop computer, either via wires or wirelessly. Synchronization ensures that the data on both devices are identical (at least at the time of synchronization).

In wireless wide area networks, communication primarily occurs through the transmission of radio signals over analog, digital cellular, or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), Third Generation (wideband or "3G"), Fourth Generation (broadband or "4G"), personal digital cellular ("PDC"), or through packet-data technology over analog systems such as cellular digital packet data (CDPD") used on the Advance Mobile Phone Service ("AMPS").

The terms "wireless application protocol" or "WAP" mean a universal specification to facilitate the delivery and presentation of web-based data on handheld and mobile devices with small user interfaces. "Mobile Software" refers to the software operating system which allows for application programs to be implemented on a mobile device such as a mobile telephone or PDA. Examples of Mobile Software are Java® and Java ME®, (Java and JavaME are trademarks of Sun Microsystems, Inc. of Santa Clara, Calif.), BREW® (BREW is a registered trademark of Qualcomm Incorporated of San Diego, Calif.), Windows Mobile® (Windows is a registered trademark of Microsoft Corporation of Redmond, Wash.), Palm OS® (Palm is a registered trademark of Palm, Inc. of Sunnyvale, Calif.), Symbian OS® (Symbian is a registered trademark of Symbian Software Limited Corporation of London, United Kingdom), ANDROID OS® (ANDROID is a registered trademark of Google, Inc. of Mountain View, Calif.), and iPhone OS® (iPhone is a registered trademark of Apple, Inc. of Cupertino, Calif.). "Mobile Apps" refers to software programs written for execution with Mobile Software.

Figure 12A:
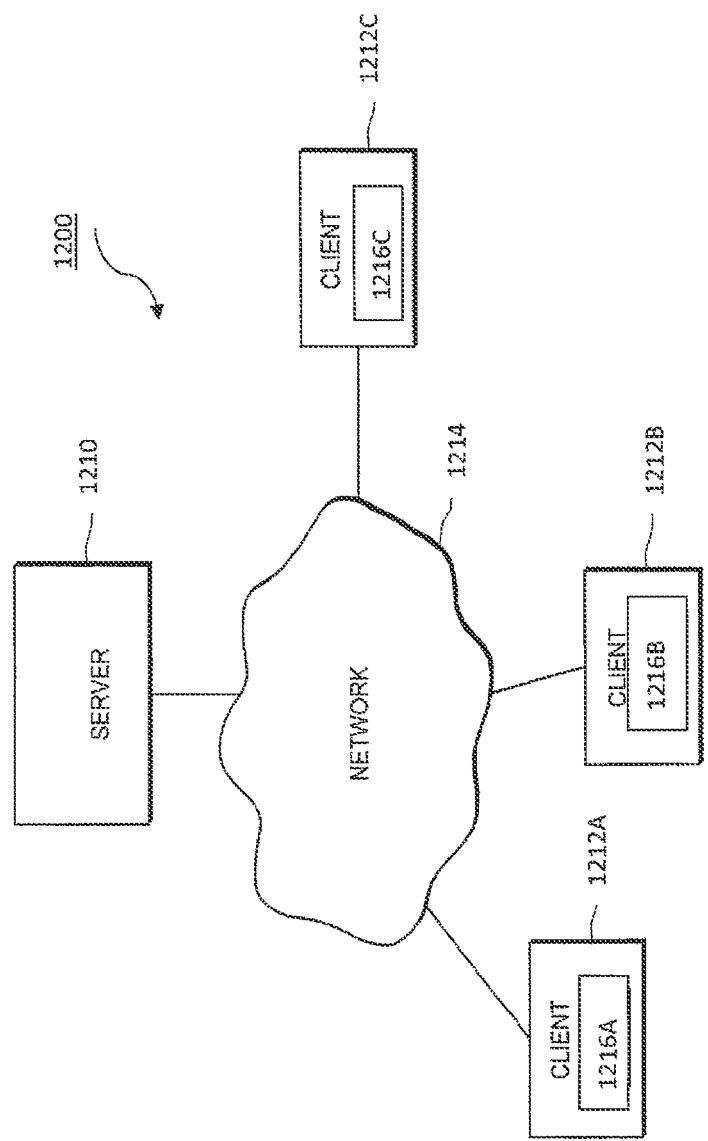
FIG. 12A is a schematic diagrammatic view of a network system in which embodiments of the present invention may be utilized.

FIG. 12A is a high-level block diagram of a computing environment 1200 according to one embodiment. FIG. 12A illustrates server 1210 and three clients 1212 connected by network 1214. Only three clients 1212 are shown in FIG. 12A in order to simplify and clarify the description. Embodiments of the computing environment 100 may have thousands or millions of clients 1212 connected to network 1214, for example the Internet. Users (not shown) may operate software 1216 on one of clients 1212 to both send and receive messages through network 1214 via server 1210 and its associated communications equipment and software (not shown).

Figure 12B:
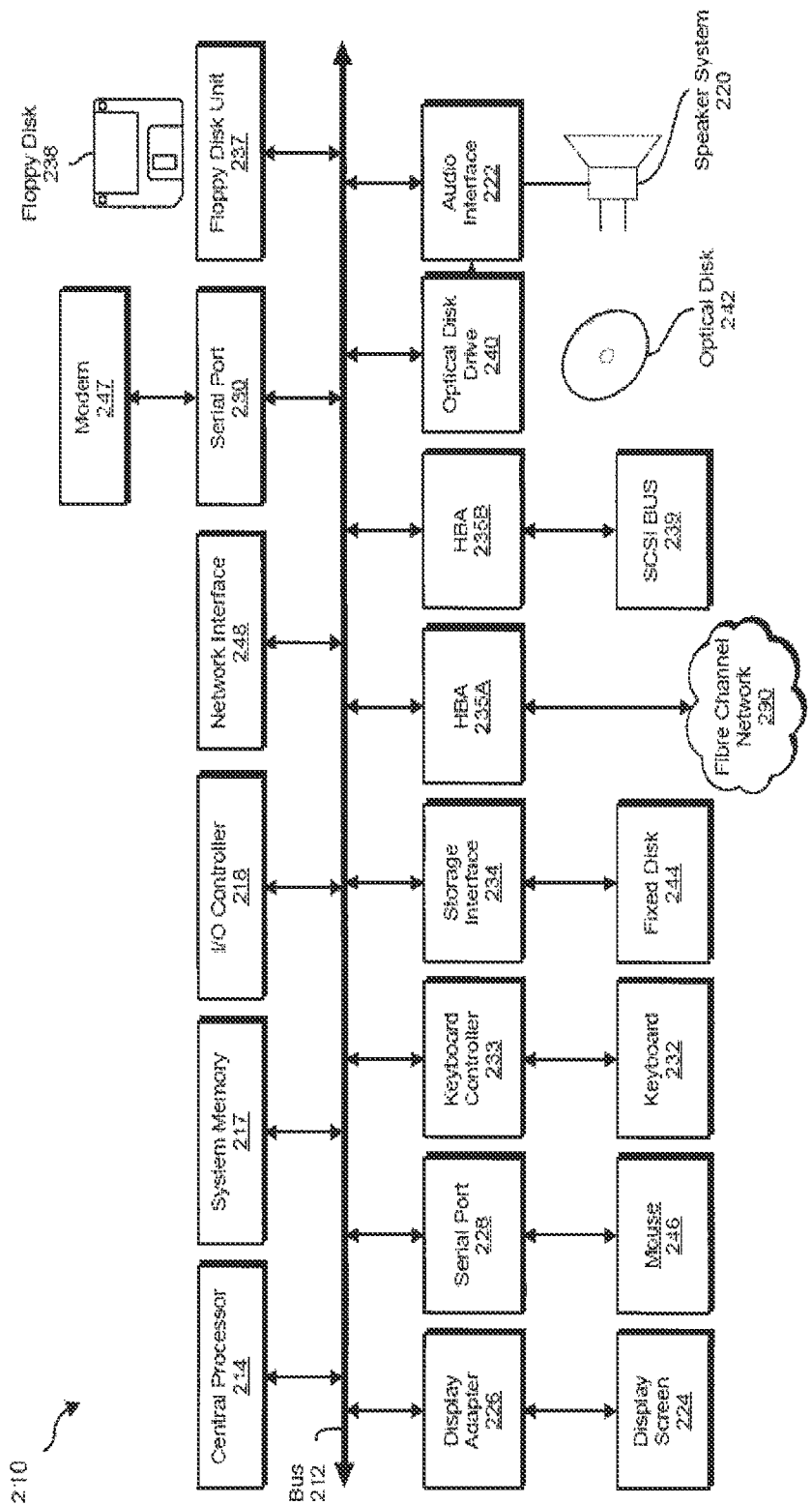
FIG. 12B is a block diagram of a computing system (either a server or client, or both, as appropriate), with optional input devices (e.g., keyboard, mouse, touch screen, etc.) and output devices, hardware, network connections, one or more processors, and memory/storage for data and modules, etc. which may be utilized in conjunction with embodiments of the present invention.

FIG. 12B depicts a block diagram of computer system 210 suitable for implementing server 1210 or client 1212. Computer system 210 includes bus 212 which interconnects major subsystems of computer system 210, such as central processor 214, system memory 217 (typically RAM, but which may also include ROM, flash RAM, or the like), input/output controller 218, external audio device, such as speaker system 220 via audio output interface 222, external device, such as display screen 224 via display adapter 226, serial ports 228 and 230, keyboard 232 (interfaced with keyboard controller 233), storage interface 234, disk drive 237 operative to receive floppy disk 238, host bus adapter (HBA) interface card 235A operative to connect with Fibre Channel network 290, host bus adapter (HBA) interface card 235B operative to connect to SCSI bus 239, and optical disk drive 240 operative to receive optical disk 242. Also included are mouse 246 (or other point-and-click device, coupled to bus 212 via serial port 228), modem 247 (coupled to bus 212 via serial port 230), and network interface 248 (coupled directly to bus 212).

Bus 212 allows data communication between central processor 214 and system memory 217, which may include read-only memory (ROM) or flash memory (neither shown), and random access memory (RAM) (not shown), as previously noted. RAM is generally the main memory into which operating system and application programs are loaded. ROM or flash memory may contain, among other software code, Basic Input-Output system (BIOS) which controls basic hardware operation such as interaction with peripheral components. Applications resident with computer system 210 are generally stored on and accessed via computer readable media, such as hard disk drives (e.g., fixed disk 244), optical drives (e.g., optical drive 240), floppy disk unit 237, or other storage medium. Additionally, applications may be in the form of electronic signals modulated in accordance with the application and data communication technology when accessed via network modem 247 or interface 248 or other telecommunications equipment (not shown).

Storage interface 234, as with other storage interfaces of computer system 210, may connect to standard computer readable media for storage and/or retrieval of information, such as fixed disk drive 244. Fixed disk drive 244 may be part of computer system 210 or may be separate and accessed through other interface systems. Modem 247 may provide direct connection to remote servers via telephone link or the Internet via an internet service provider (ISP) (not shown). Network interface 248 may provide direct connection to remote servers via direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12B need not be present to practice the present disclosure. Devices and subsystems may be interconnected in different ways from that shown in FIG. 12B. Operation of a computer system such as that shown in FIG. 12B is readily known in the art and is not discussed in detail in this application. Software source and/or object codes to implement the present disclosure may be stored in computer-readable storage media such as one or more of system memory 217, fixed disk 244, optical disk 242, or floppy disk 238. The operating system provided on computer system 210 may be a variety or version of either MS-DOS® (MS-DOS is a registered trademark of Microsoft Corporation of Redmond, Wash.), WINDOWS® (WINDOWS is a registered trademark of Microsoft Corporation of Redmond, Wash.), OS/2® (OS/2 is a registered trademark of International Business Machines Corporation of Armonk, N.Y.), UNIX® (UNIX is a registered trademark of X/Open Company Limited of Reading, United Kingdom), Linux® (Linux is a registered trademark of Linus Torvalds of Portland, Oreg.), or other known or developed operating system.

Moreover, regarding the signals described herein, those skilled in the art recognize that a signal may be directly transmitted from a first block to a second block, or a signal may be modified (e.g., amplified, attenuated, delayed, latched, buffered, inverted, filtered, or otherwise modified) between blocks. Although the signals of the above described embodiments are characterized as transmitted from one block to the next, other embodiments of the present disclosure may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The terms "Rules," "Criteria," "Stages," "Contacts," and Scoring have specific meanings in the context of the presently disclosed system. "Rules" refers to business rules setup in the invention by every customer, and allow the invention to calculate the Profile Score™ evaluation and Engagement Score™ evaluation of their Contacts. Rules are unique to each customer's own business. "Gate Criteria" refers to the business rules setup in the invention by every customer, and allow the invention to calculate which Stage a Contact belongs to. "Stages" refers to the lifecycle relationship stages setup in the invention by every customer, and allow the invention to graphically show where the Contacts are in the lifecycle using the Lifecycle Map™ marketing chart. "Contact" refers to prospects and customers of the customers of the invention. "Scoring" refers to the score, a number, assigned to the Contacts based on the business rules setup in the invention by every customer, and allows the invention to graphically show how close to ideal the Contacts are, using the Lifecycle Map™ marketing chart.

Scoring is established by first looking at two dimensions: Ideal Profile and Engagement. The former assesses how well a lead or customer matches the attributes of the ideal contact and is called the "Profile Score™ evaluation". The latter assesses the Contact's level of engagement and is called the "Engagement Score™ evaluation". The best outcome, of course, is the highly engaged Contact that matches the ideal profile.

First, to generate the Profile Score, the system allows a marketer to list the attributes of an ideal Contact. It then allows marketer to assign either a discrete value or a range to each attribute. For example, companies under $2 billion annual sales might earn 5 points and those larger earn 10 points. The maximum number of points assigned to each attribute relative to the maximum number of points assigned to another attribute drives the importance, or weight, of the attributes. A Contact's overall Profile Score is the sum of the attribute scores. Referring to FIG. 10, Profile Score Tab 1000 allows a user to input a business rules setup system including the categories of Title 1001, Industry 1002, Annual Revenue 1003, Age 1004, and Dealer Type 1005, and under each category listing a type of Criteria in Criteria Name Field 1006 and assigning the listed Criteria a respective Profile Score in Profile Score Field 1007. Each Contact is compared against the information set forth in the Profile Score Tab 1000 when the system generates the Profile Score for that Contact.

Second, the system then lets the marketer list the key attributes that describe a Contact's level of engagement. Engagement is driven by whether a Contact was sent a physical or electronic communication and whether the Contact responded to that touch point. Marketers use one or more of various communication devices—print, email, voice, text, fax, webinars, web sites, social media, landing pages, among others. The system allows marketer to select one or more communication devices they currently utilize. It then allows marketer to assign a discrete value for a successful response from the Contact for each attempted touch point. Referring to FIG. 11, under Engagement Score Tab 1100 business rules may be set forth to assign such discrete values for type of responses from Contacts for each attempted touch point. Communication devices shown that are assigned values are Email 1101, Twitter 1102, Webinar 1103, Four Square 1104, Facebook 1105, and SalesActivity 1106, each having a respective target score listed along with respective touch points. Values may be set for the interaction types listed. For example, touch points for Email 1101 are shown as a sending event where an Email is sent to a Contact and an open event touch point where the Contact opens the Email, for each of which 1 point is set and assigned by the user. A click event touch point where a Contact clicks upon the event in the email is assigned 5 points, and a bounce event touch point where an Email is bounced is assigned negative 1 point. An unsubscribe event where a Contact unsubscribed from an event is assigned negative 7 points. The target score for a Contact is shown as 7 points.

As another example, after a Contact has been invited to a webinar, a successful response would be recorded when Contact attends the webinar and will be assigned a score of 7 points. Simply registering for a webinar, but not attending, would be treated as incomplete response and would be assigned a score of 2 points. The maximum number of points assigned to each device relative to the maximum number of points assigned to another device drives the importance, or weight, of the touch points using that device. A Contact's overall Engagement Score™ evaluation is the sum of the scores across the devices. For example, in the illustration of FIG. 6, user has selected two communication devices—Email and Webinar. For Email, user has decided that they want to assign a score of 1 for opening the email and a score of 4 for clicking any link in the email. If email recipient has done both—opened the email as well clicked on at least one link, they have a total score of 5 out a maximum possible of 5 for that one touch-point. This would indicate a fully engaged Contact for that touch-point. Below is an exemplary worksheet showing the scoring of the e-mail and webinar.

Next, the system then asks the marketer to name the Stages their Contacts go through in their relationship. The system asks the marketer the thresholds that must be met in order to move the Contact to the next Stage in the Lifecycle. These thresholds are called "Gate Criteria". The Gate Criteria, the rules for calculating the Engagement Score™ evaluation and the rules for calculating the Profile Score™ evaluation are stored by the system for each individual marketer in a portion of the customer database. In addition, locations of original data and access routines and/or API's to access the original data may be stored in the customer database.

Figure 4A:
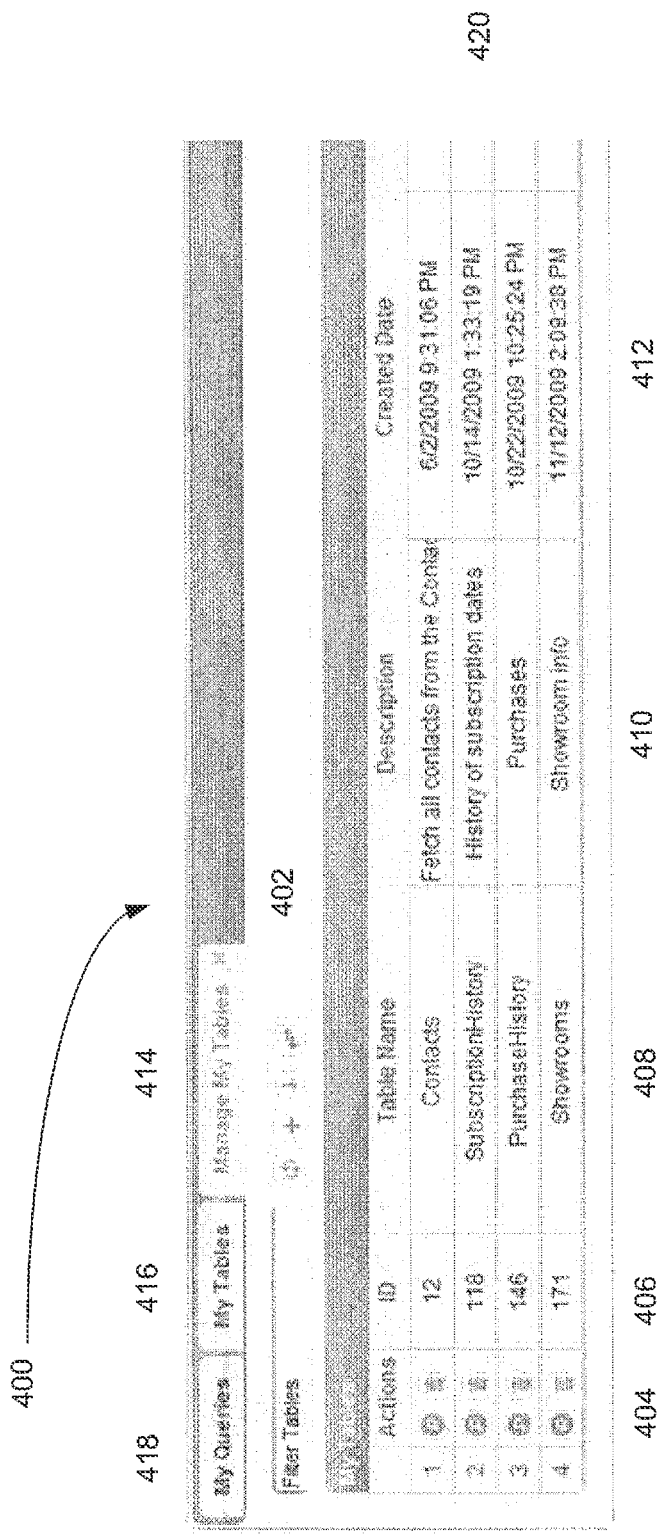
Figure 4B:
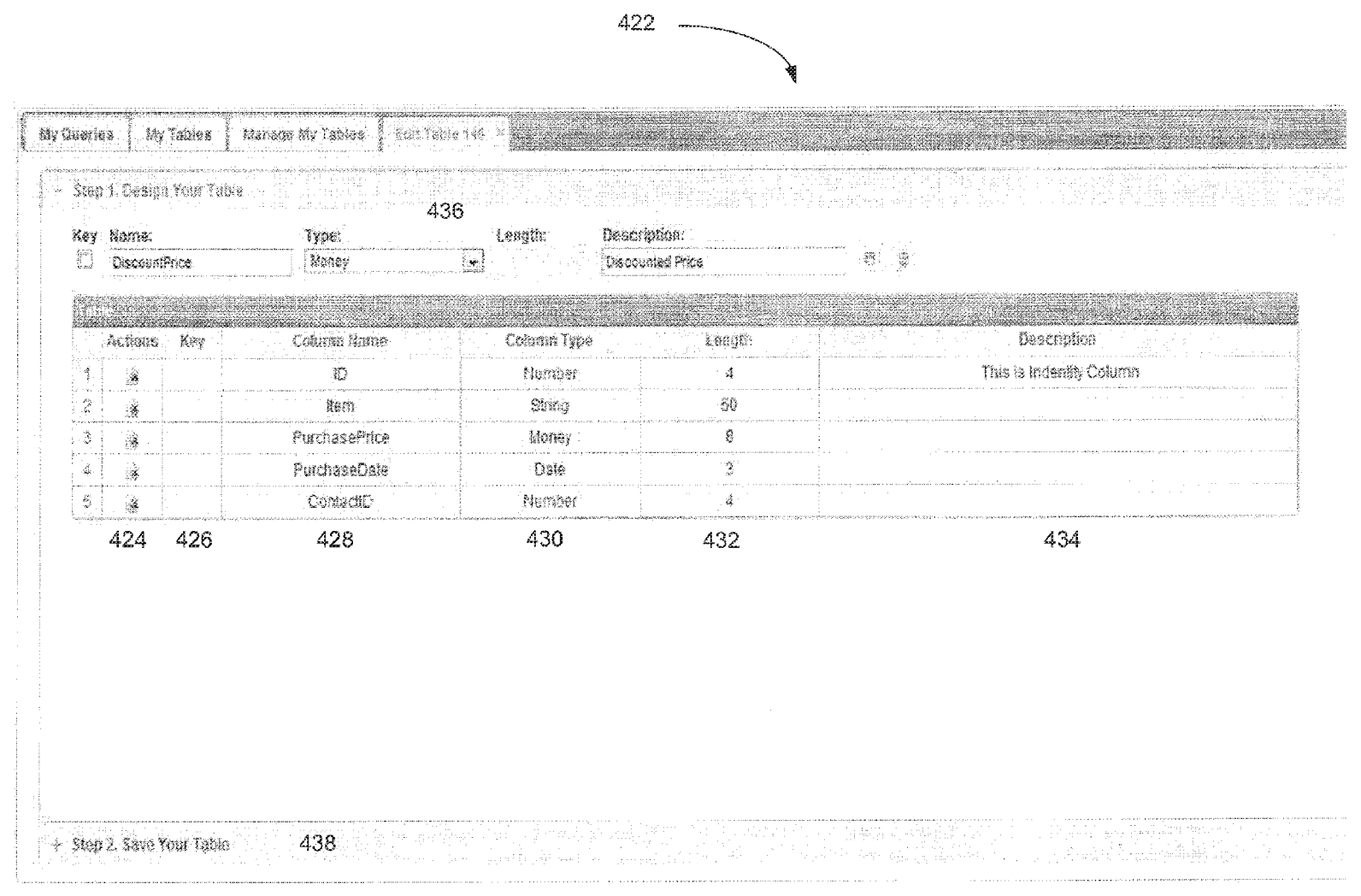
Figure 4C:
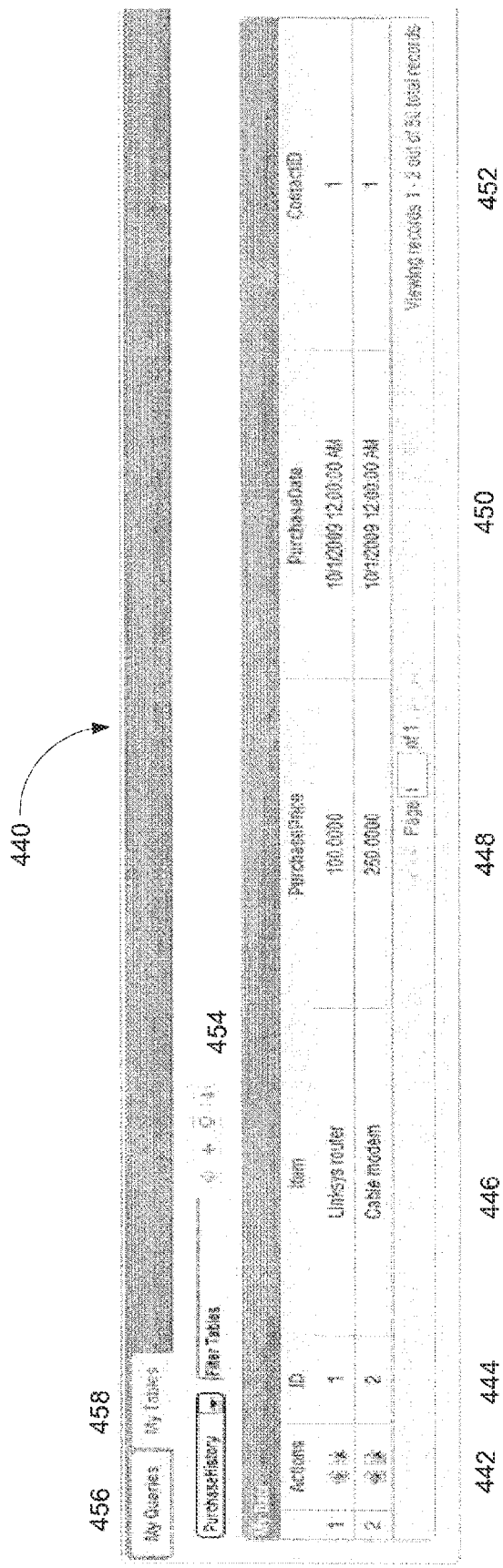

The system takes the Gate Criteria, the rules for calculating the Engagement Score™ evaluation and the rules for calculating the Profile Score™ evaluation, all three as defined by the marketing user for their specific case, and generates a Lifecycle Map™ marketing framework or chart. The map helps a marketer develop their targeted marketing and nurturing campaigns to move the Contacts further along in their relationship with the company. FIGS. 4A-4C and the related discussion below shows the UI for accomplishing those user interactions. Also further discussed below, a generated Lifecycle Map™ marketing chart may be drilled down to individual client attributes, or grouping of attributes.

Most businesses operate in an environment where customer data exists in many different systems or databases—CRM, e-mail marketing databases, call center history logs, order entry systems and sales databases to name a few. The type of data collected on customers and prospects and the degree of automation in any business runs the gamut from modest to highly sophisticated. When it comes to creating a roadmap for automating communications throughout the customer Lifecycle, most companies do not have the luxury of starting with a clean slate and a large budget; the automation roadmap must utilize and integrate with the applications and systems already in place. The system allows the use of custom API's and/or automated data exchange facilities with each customer, so that original data from those customer systems are accessed and used in creating the Lifecycle Map™ marketing map.

FIG. 1 shows a schematic diagram of System 100, which in one embodiment is configured as a server in communication with a wide area network such as the Internet. However, system 100 may communicate through other data transmission/exchange mechanisms, and the individual components shown in this exemplary embodiment as being integrally disposed within system 100, such components may alternatively be configured at remote locations in a distributed computing environment. Shared database area 102 is accessed by Service Software 104, which in turn is operated by users through either directly through UI Layer 106, or through API Layer 108. Each user may manipulate its own Customer Data 110 through Business Logic Layer 112 to operate on specific portions of Shared Database Area 102 which is logically separated by Logical Security Layer 114, and accessed through Data Access layer 116. Original data from each customer is accessed from Customer Enterprise Sources 118 and/or 120 by UI Layer 106 and/or API Layer 108.

Regardless of the data and organization currently in place, the system according to one embodiment of the invention allows businesses to quickly achieve success in automating the customer Lifecycle. The system allows companies to organize its customers into actionable marketing segments, automating the delivery of relevant out-bound communications through multiple channels, and automating the workflow and tasks associated with effective lead management. UI Layer 106 and/or API Layer 108 obtains original customer data from those various sources from the scripts, procedures, and APIs as specified in Customer Data 110 and from the Shared Database Area 102. The system loads information about the Rules, Gate Criteria and Stages from the Shared Database Area 102, and applies them to the data stored in Customer Data 110 using the algorithm described in FIGS. 2A-C, described further below.

A basic tenet of Software as a Service product is a multi-tenant, multi-user architecture that allows a wide variety of companies to use the same product, but customized to meet their own specific needs. The Lifecycle Stages, the Gate Criteria and the Rules follow a similar pattern across customers and are stored in the Shared Database Area 102. The data about the Contacts is sensitive information and unique to each Company, and is stored in a corresponding Customer Data 110.

Embodiments designed according to the principles of the present invention include a new way to allow a user to create a custom database inside the multi-tenant architecture of a Software-as-a-Service ("SaaS") product. A user may define the tables, fields, data constraints and relationships between tables within the SaaS product. The user may also associate various source data fields from enterprise systems with those tables and fields, in effect defining common meta-data amongst differing data sources. For example, a Contact in a CRM system may have one set of associated meta-data with fields relating to Contacts, while the same company's enterprise resource planning ("ERP") system may have a second set of associated meta-data with fields relating to Contacts. With the SaaS product, the user may create associations between the various data sources and the tables and fields within the SaaS product and store those associations in its own custom database. Thus, each user may have its own unique set of tables and fields that do not interfere with other users of the product. This allows user to load data that pertains to their business. Thus while users may be using a SaaS product, the system allows them to work within an area that is unique to their own needs. FIGS. 4A-C show examples of the mapping of such relationships.

FIG. 4A shows configuration screen 400 having table management window 402 for specifying tables 420 from a source database (not shown) such as enterprise resource planning databases, customer relationship management databases, campaign management databases, etc. Tables 420 may be acted on by actions buttons 404 (e.g., expand or delete), and may be identified by ID 406. The user may specify name 408 or description 410 by importing from the source database or entering names or descriptors, and other data may be included such as created date 412. In one embodiment, description 410 is a free text field. In an alternative embodiment, description 410 includes a list of predefined descriptors, and the user selects the appropriate descriptor. Further information about tables 420 may also be added (not shown) including transfer protocols, login information, and other access and/or security related provisions.

FIG. 4B shows configuration screen 422 having edit table window 436 for editing the designation of table fields from a source table (not shown). In this exemplary embodiment, each table entry has actions field 424, key field 426, column name 428, column type 430, length 432, and description 434. While typically the values of the various fields are inherited from the original table, window 436 allows the editing of these values so that the user may make fields from different data sources compatible for eventual data combination. In addition, certain fields may be associated with scoring factors so that the user is able to map each particular data source with a relevant scoring designation. Such designation may be done by drop down menus providing only a predefined set of scoring factors with which to associate a field, or alternatively may be done by allowing data in the field to indicate the appropriate association, e.g. by having textual nomenclature associated with each scoring factor. Once the user has made appropriate edits with window 436, the edits may be saved by the user activating Save Table tab 438.

FIG. 4C shows table display window 440, wherein listing page 454 provides a view of data existing within a selected table available under My Tables tab 458. Such data display may be further refined by application of a particular query selected under My Queries tab 456 (such query selection not shown). In this exemplary embodiment, the selected table is Purchase History, and records include Action field 442, ID field 444, Item field 446, Purchase Price field 448, Purchase Date 450, and ContactID 452. Using this view of relevant data, the user may fashion scoring factors that are relevant to the representative data from its own system. In this example, at least three fields have potentially useful data: Item filed 446 (e.g., a textual description of a product), Purchase Price field 448 (e.g., a numeric value), and Purchase Date field 450 (e.g., a numeric date value). This would allow the user to create scoring factors based on one or more of these items, for example having a special scoring when a particular high priority item appears in Item filed 446, or having a scoring factor depend on the amount of the price or the date of the purchase. Through a combination of stored queries under tab 456 and defined scoring factors, specific scoring ratings may be fashioned by the user. For example, if one scoring factor was the number of months where sales are above a certain number, the user could set up queries for selecting a single month of data records, and each of those query results may be further processed by totaling the purchase price in each month and counting the number of times the total exceeded a predetermined threshold.

Figure 4E:
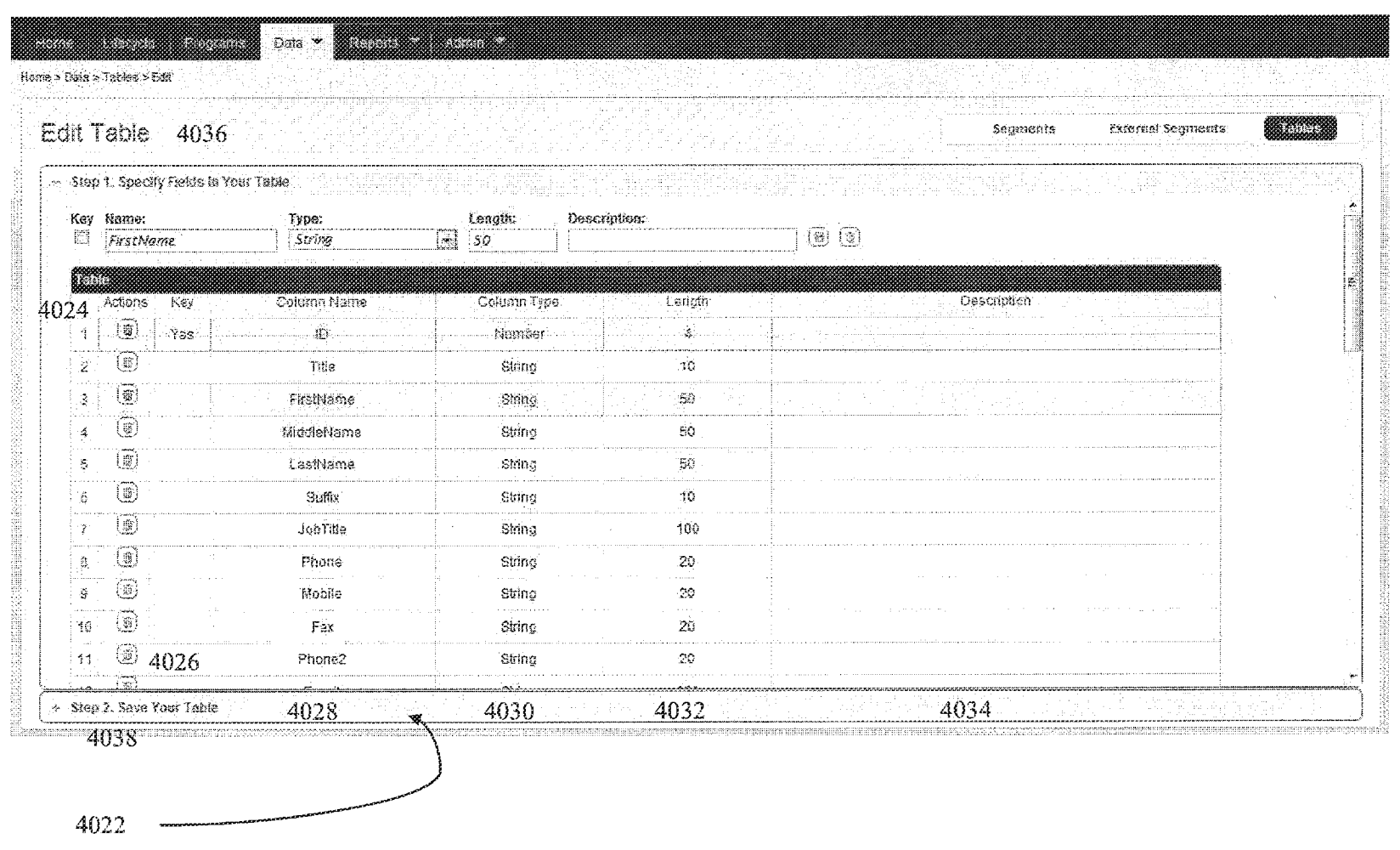
Figure 4F:
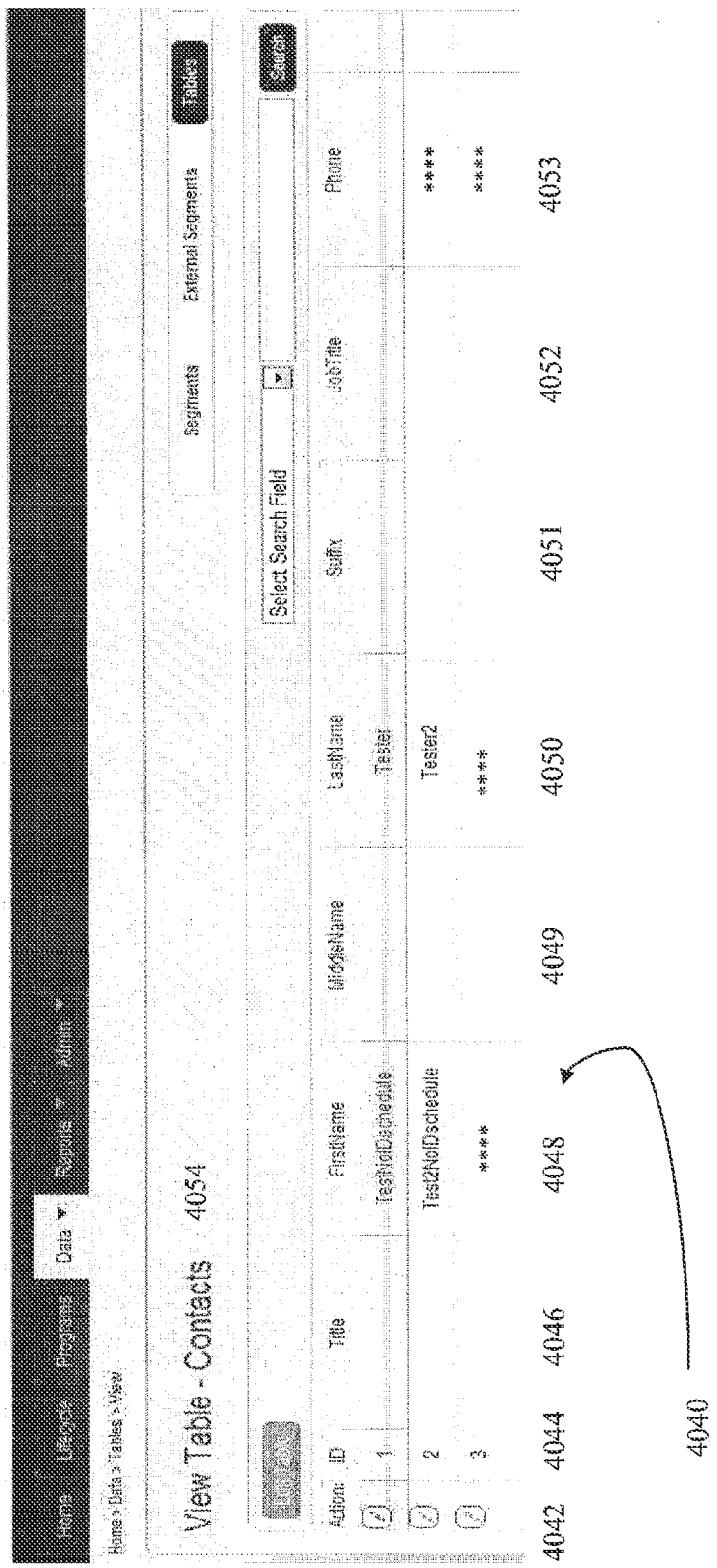

FIGS. 4D-4F illustrate an alternative embodiment that is similar to the embodiment of FIGS. 4A to 4C, except for the differences described below. FIG. 4D shows configuration screen 4000 having table listing window 4002 for specifying tables 420 from a source database, as described above. Tables 4020 may be acted on by actions buttons 4004, the user may specify name 4008 or description 4010, and other data may be included such as created date 4012, created by data 4013, last modified data 4015, and last modified by data 4017.

FIG. 4E shows configuration screen 4022 having edit table window 4036. In this exemplary embodiment, each table entry has actions field 4024, key field 4026, column name 4028, column type 4030, length 4032, and description 4034. Once the user has made appropriate edits with window 4036, the edits may be saved by the user activating Save Table tab 4038.

FIG. 4F shows configuration screen 4040, wherein table display window 4054 provides a view of data existing within a selected table. In this exemplary embodiment, the selected table is Contacts, displaying records including Action field 4042, ID field 4044, Title field 4046, First Name field 4048, Middle Name field 4049, Last Name field 4050, Suffix field 4051, Job Title field 4052, and Phone field 4053. Using this view of relevant data, the user may review information regarding the user's Contacts.

Figure 5:
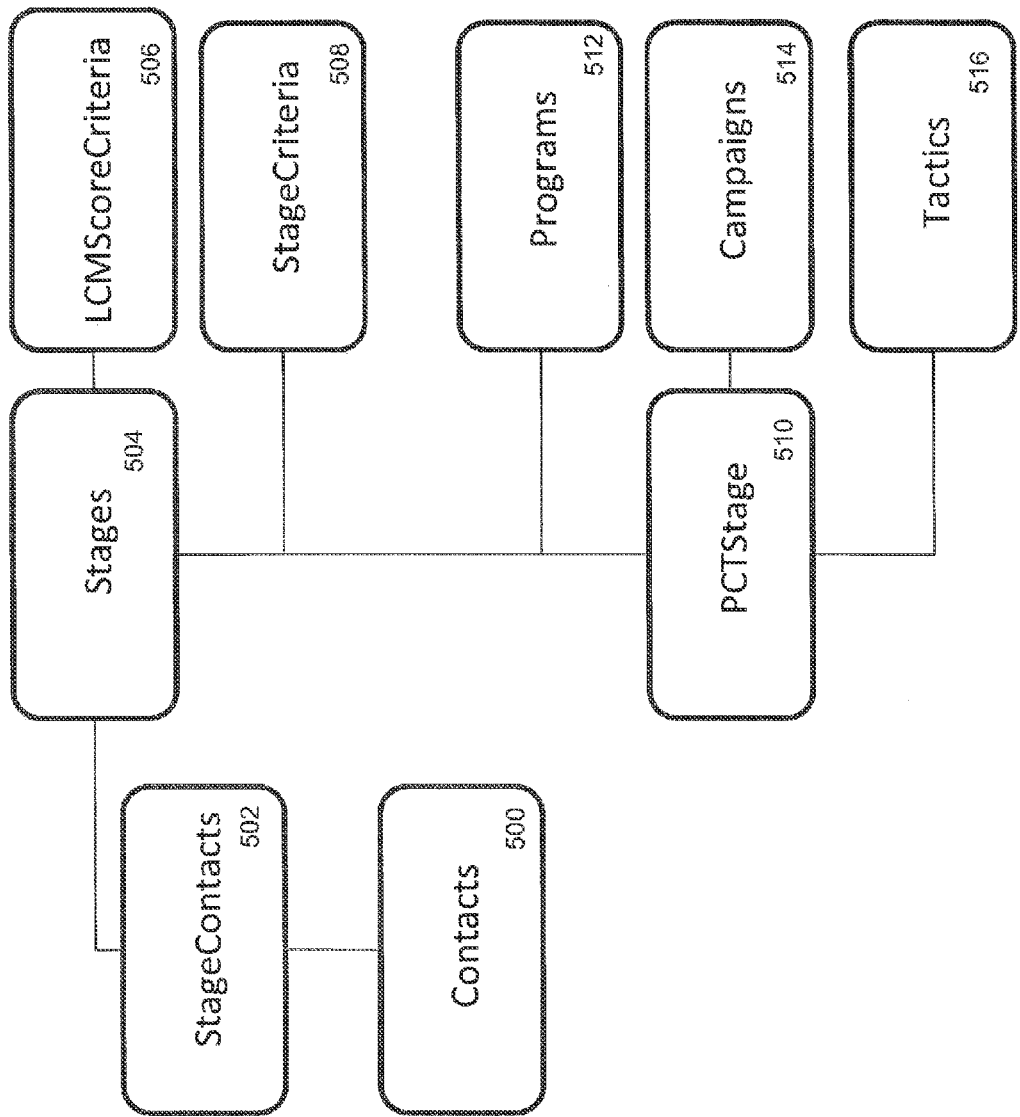
FIG. 5 is the Entity Relationship Diagram (ERD) describing how the invention manages information about the rules, criteria and stages defined by users.

Next, the system allows users to define their Lifecycle stages. User identifies the name of the stage and the Gate Criteria that decides if a Contact belongs to a certain Stage. Similarly, the user is allowed to define the rules for their Profile Score™ evaluation and the rules for the Engagement Score™ evaluation. The criteria and the rules are based on the user's data loaded in to the system. FIG. 5 shows one embodiment of the data model apparent to the user. Contacts 500 represents the universe of potential customers, while Stage-Contacts 502 represents the Contacts which are active. Stages 504 represents the various stages that the user may define, using both scoring criteria from LCMScoreCriteria 506 and criteria defining each Stage in StageCriteria 508. Within each Stage, PCTStage 510 represents the various activities that might be evaluated in scoring the Stage, in this exemplary embodiment including Programs 512, Campaigns 514, and Tactics 516.

For every company that uses the system, the system carves out a section in its database. The company is granted exclusive access to its part of the database. Any tables, fields, data constraints and relationships between tables created by the user are confined to their own section in the database. The data loaded in to these tables is available to only the users that have access to the section of the database. The system takes advantage of inherent functionality available inside of conventional database systems, in one embodiment such system being Microsoft's SQL Server RDBMS product, to create individual sections for companies. The system then employs logical security measures based on the programming logic developed inside the system coupled with the hardware hosting the database system. This ensures each company is confined to their section of the database for their own data.

The system has a set of common database tables that hold the Lifecycle stages, Gate criteria, rules for Engagement Score™ evaluation and rules for Profile Score™ evaluation for all companies. The system provides an easy to use interface to allow user to create and modify Lifecycle stages, Gate criteria, rules for Engagement Score™ evaluation and rules for Profile Score™ evaluation. These items are serialized and stored in a specialized XML format in system 100's database 102.

System 100 calculates the Lifecycle Map™ marketing chart for each company on a scheduled basis, typically nightly. A user may also ask the system to generate the Lifecycle Map™ marketing chart on-demand as and when the data changes. Based on the data provided on the Lifecycle Map™ marketing chart, the marketer will develop her/his own marketing strategy. The marketer will select the audience they want to target and create Programs, Campaigns and Tactics to send targeted communications and drive further engagement with their Contacts. As the Programs, Campaigns and Tactics are executed over time, the marketer is able to measure progress by looking at the regularly updated map to see if a) the Contacts plotted on the map are moving in the right direction; b) Contacts are migrating to Stages upstream in the process; c) new Contacts are entering the initial Stage; and d) any other criteria the marketer desires to establish.

For system 100 to display the Lifecycle Map™ marketing chart, it needs to know the following: (1) The highest possible Engagement Score for a Stage; (2) The lowest possible Engagement Score™ evaluation for a Stage; (3) The highest possible Profile Score™ evaluation; (4) The lowest possible Profile Score™ evaluation; (5) A list of Contacts in each of the Stages; (6) The Engagement Score™ evaluation of each of the Contacts; and (7) The Profile Score™ evaluation of each of the Contacts, in order to provide the appropriate dimensions on the chart. System 100 calculates item #1 and item #2 based on "sends", or the number of touch-points that have been attempted. This number is dynamic and calculated at the time of generating the Lifecycle Map™ marketing chart. System 100 calculates items #3 and #4 when user is setting up the rules for Profile Score™ evaluation. As mentioned previously, to generate the Profile Score™ evaluation, the system allows a marketer to list the attributes of an ideal contact. It then allows the marketer to assign either a discrete value or a range to each attribute. System 100 requires the user to specify the rules for each of the attributes in the order of highest score to lowest score. System 100 looks at the first row of each of the attributes and adds up the points to get the highest possible Profile Score™ evaluation, and the points at the last row of each of the attributes and to get the lowest possible score.

System 100 calculates items #5 to #7 as part of the batch process, nightly or on-demand when user initiates an update of the Lifecycle Map™ marketing chart by clicking a button or other method of activation. Such activation invokes the same batch process that runs automatically on a scheduled basis.

The whole process of calculating which Contacts are in each Stage and their Scores is done at the database level. This prevents large amounts of data from moving out of the database to the middle tier of the system. This is achieved by creating dynamic SQL based on the Gate Criteria, the rules for Engagement Score™ evaluation and rules for Profile Score™ evaluation. The middle tier of system 100 does all the logic processing and creates several dynamic SQL statements. The SQL statements are fed to the database server and executed at the database level. System 100 executes the various SQL statements as a single unit of work. This way if one of the steps fails the system does not leave the data in a suspect state where some of the rules are applied and some are not. The user is presented either the latest Lifecycle Map™ marketing chart or the last Lifecycle Map™ marketing chart generated.

Regarding attributes utilized by system 100 when calculating a Profile Score™ of a Contact, for example, such attributes may include the size of an organization, the position of a Contact within the Contact's organization, and other indicators of the quality of the Contact. After the Lifecycle Map™ marketing chart is displayed, a user may drill down upon the chart or select an option from a drop down menu listing to view display of each of these attributes separately for each Contact or for attributes that are amalgamated between Contacts.

For example, the Contacts in the Initiate Stage of FIG. 3, described further below, may be Contacts that work in organizations of varying sizes. Further, each Contact may be in management or other positions within the respective organization of the Contact. A user may want to retrieve this information for Contacts in each different defined Stage and may do so by selecting desired portions of the displayed Lifecycle Map™ marketing chart and further focusing, or drilling down, on information in the selected portion such that the information is displayed as a granular display. In such a manner, one may select a graphic portion of a displayed Lifecycle Map™ marketing chart and view data point information or select a specified type of selectable data from a drop down menu to view the data in a graphical form.

Figure 7A:
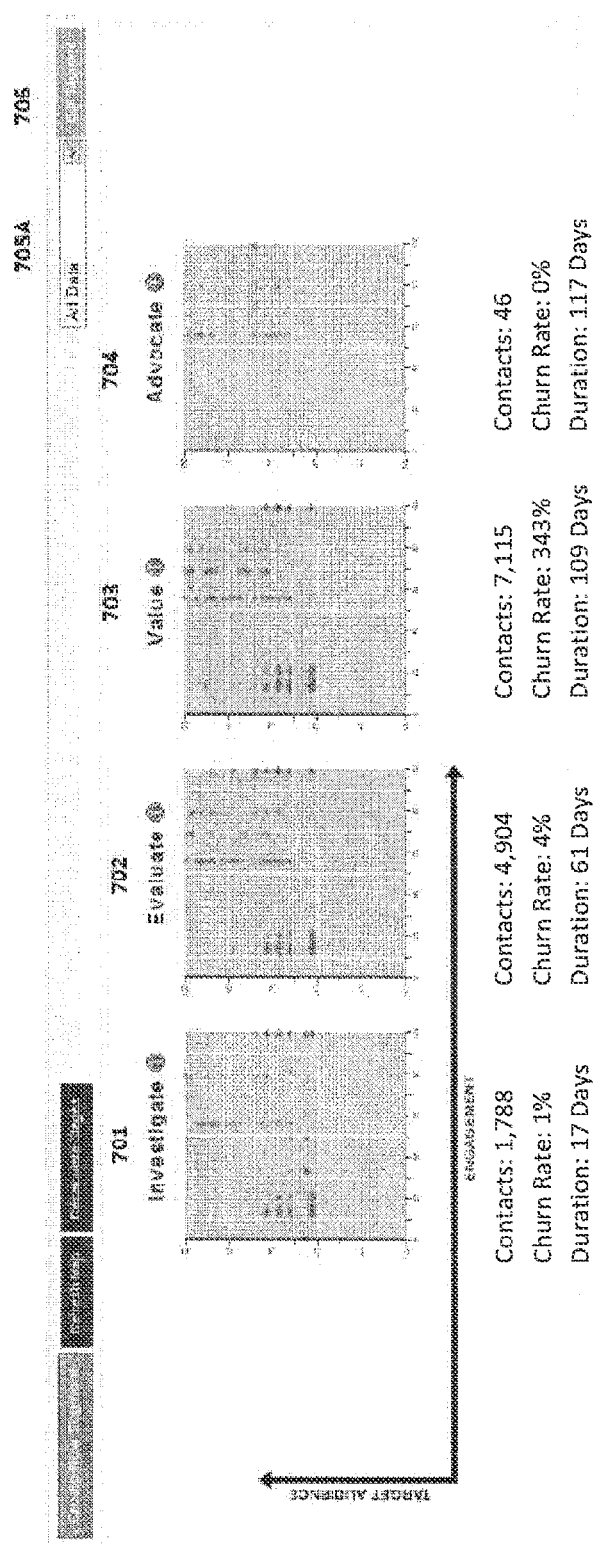
FIGS. 7A and 7B are schematic diagrams of another embodiment of a Lifecycle Map™ marketing chart according to the present invention.
Figure 9A:
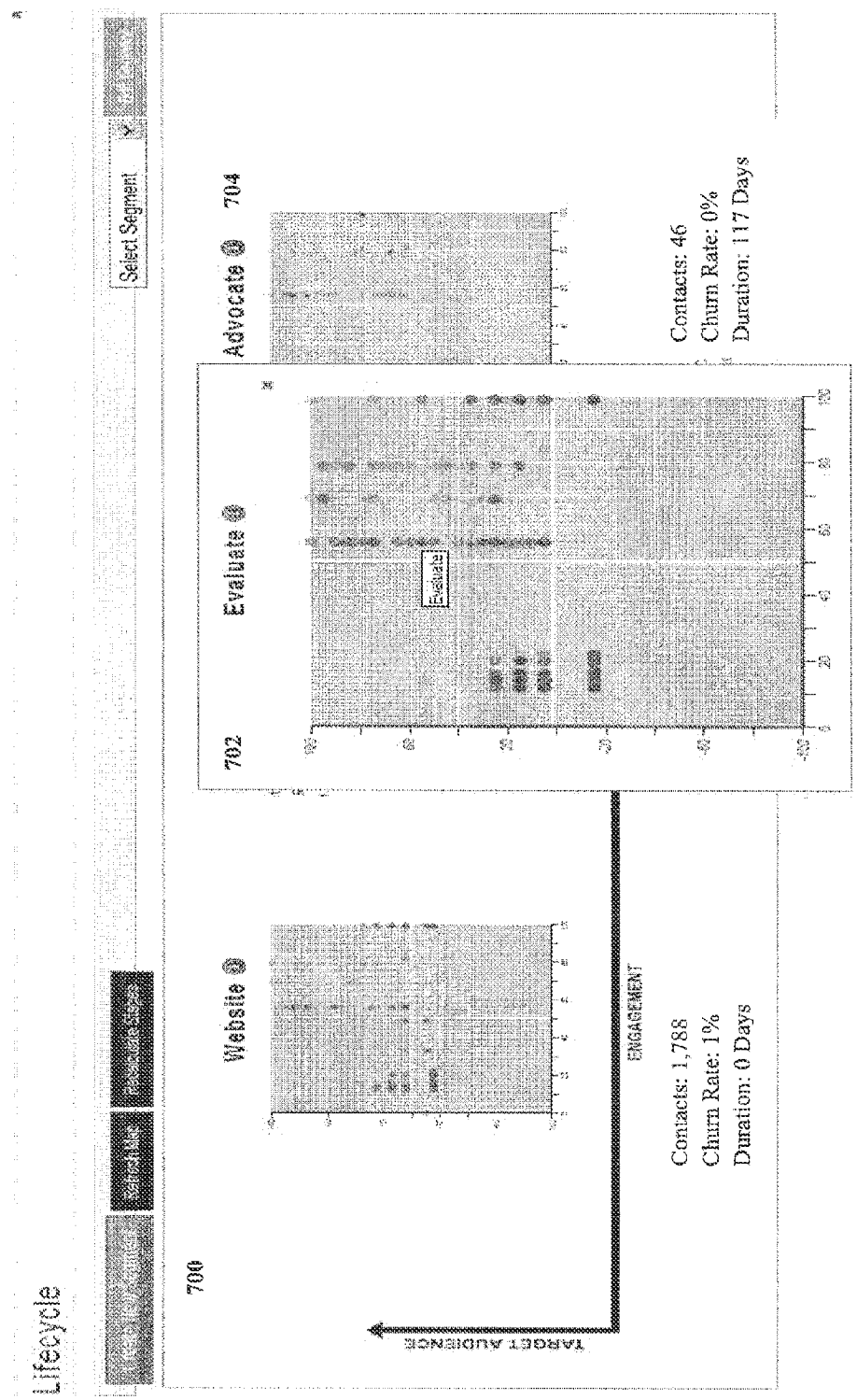
FIGS. 9A and 9B are schematic diagrams of an embodiment of a Lifecycle Map™ marketing chart according to the present invention with a specific diagram shown in an exploded view.
Figure 9B:
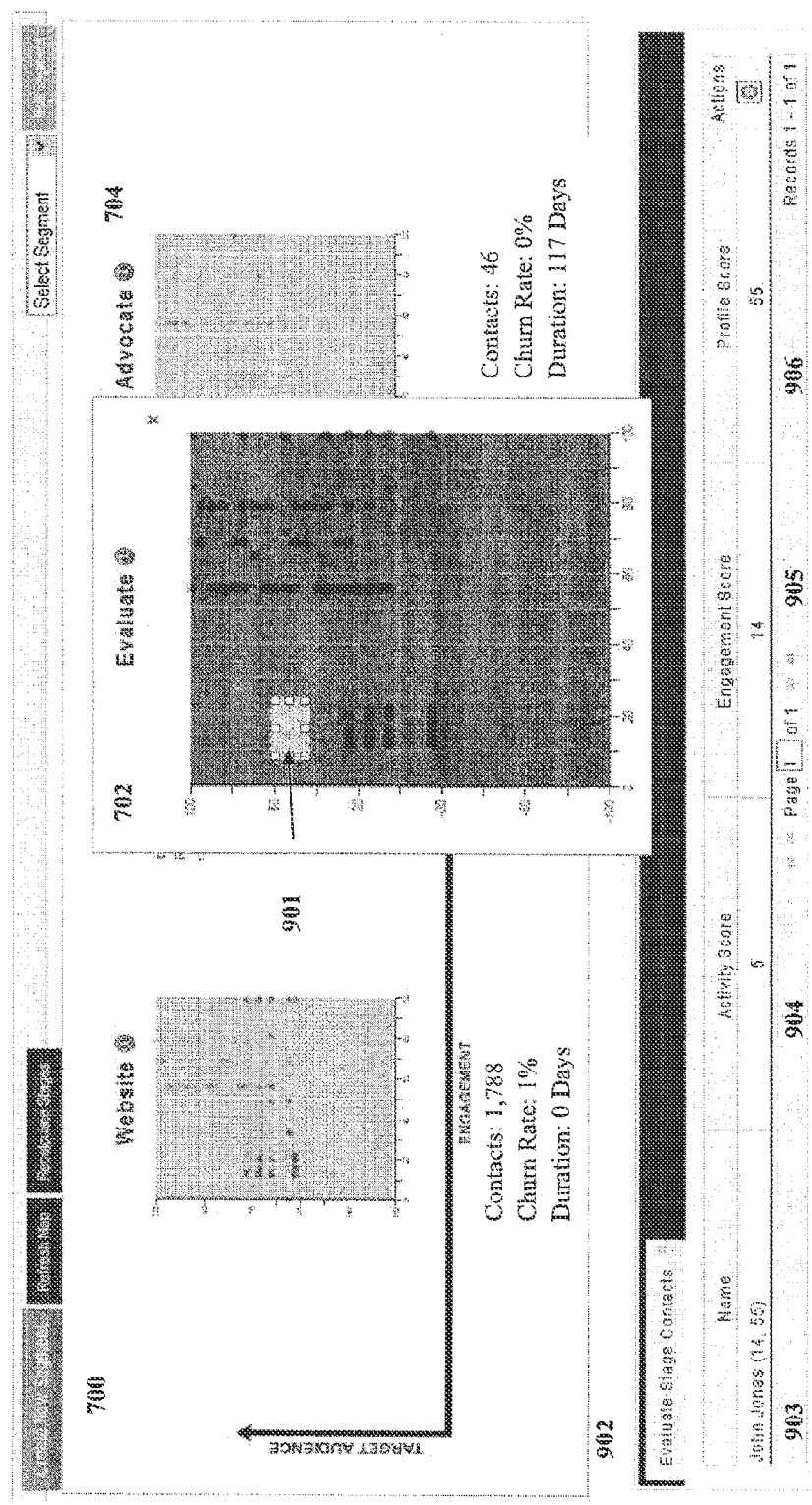

Referring to FIG. 7A, a user is presented with a display of all data for all Contacts within each of the following Stages: Investigate Stage 701, Evaluate Stage 702, Value Stage 703, and Advocate Stage 704. Investigate Stage 701 tracks all Contacts in the Universe of Customer Enterprise Data that have not progressed to a next Stage. Similarly, Website Stage 700 in FIG. 9A tracks all Contacts in the Universe of Customer Enterprise Data that have not progressed to a next Stage. Referring back to FIG. 7A, Evaluate Stage 702 tracks those Contacts who have, for example, registered for a design seminar or office assessment program. Value Stage 703 tracks those Contacts that have registered for an advanced Buyers Club program. Advocate Stage 704 tracks those Contacts that are Buyers Club members and have spent more than $1000 in the program. A user may select a Stage, such as Evaluate Stage 702, shown as selected in FIG. 9A. The Stage is then shown in an exploded view of the graphical display of the associated Lifecycle Map™ marketing chart for that particular Stage. Referring to FIG. 9B, a user may then utilize a geometric graphical selection tool 901 to select individual points in the graph via the graphical tool. Tool 901 may have a rectangular shape or other shapes such as circular, elliptical, triangular, freely drawn, and the like. The points may encompass a single Contact, as shown in FIG. 9B, or may encompass multiple Contacts. The data associated with the selected Contact or Contacts is then shown in a table listed below the exploded graph, shown as Table 902. Table 902 includes Name Field 903, indicated the name of the selected Contact or Contacts, and per each Name, a score within Activity Score 904, Engagement Score 905, and Profile Score 906.

Figure 7B:
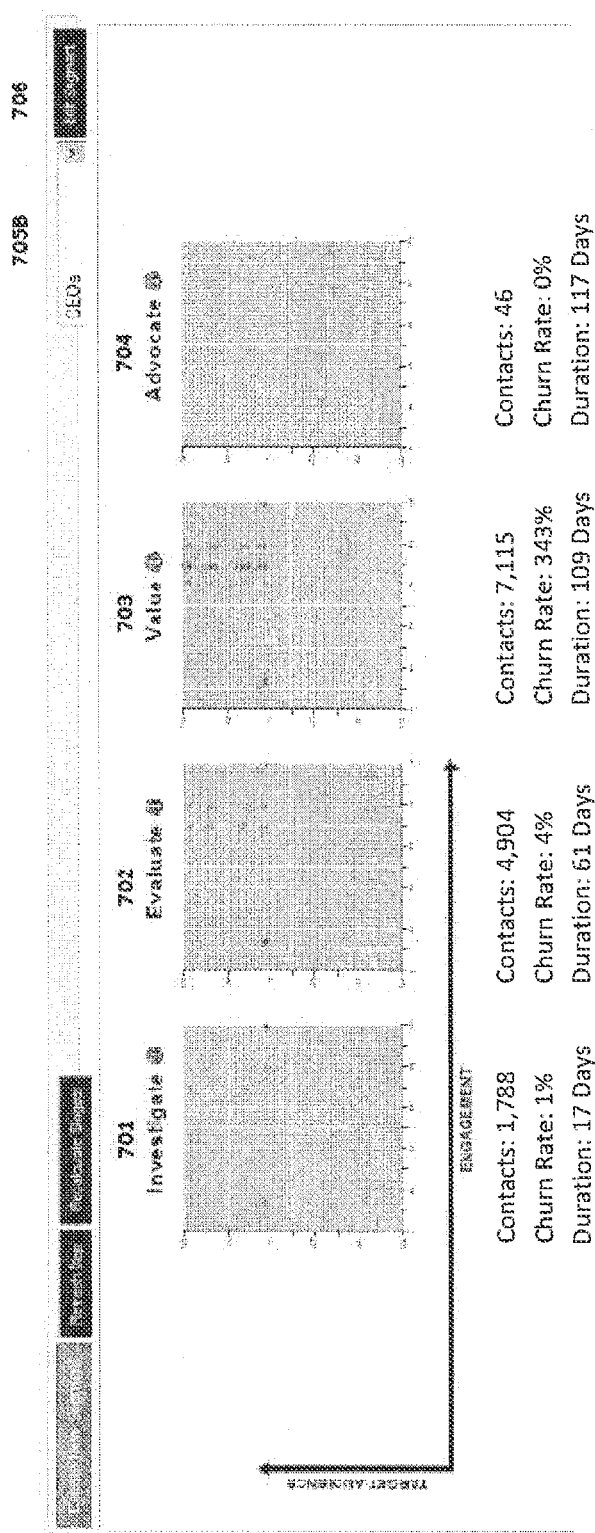

Referring back to FIG. 7A, a user may also be presented with a display of all data as selected via the drop down menu selection 705A, for all Contacts within each of the Stages, described above. Referring to FIG. 7B, a user may filter through the Contact data shown in FIG. 7A via selecting an option from drop down menu, such as the drop down menu selection 705B of "CEOs" to graphically display which and how many of the displayed Contacts in each of the Stages are in a CEO position in a respective company.

Figure 8A:
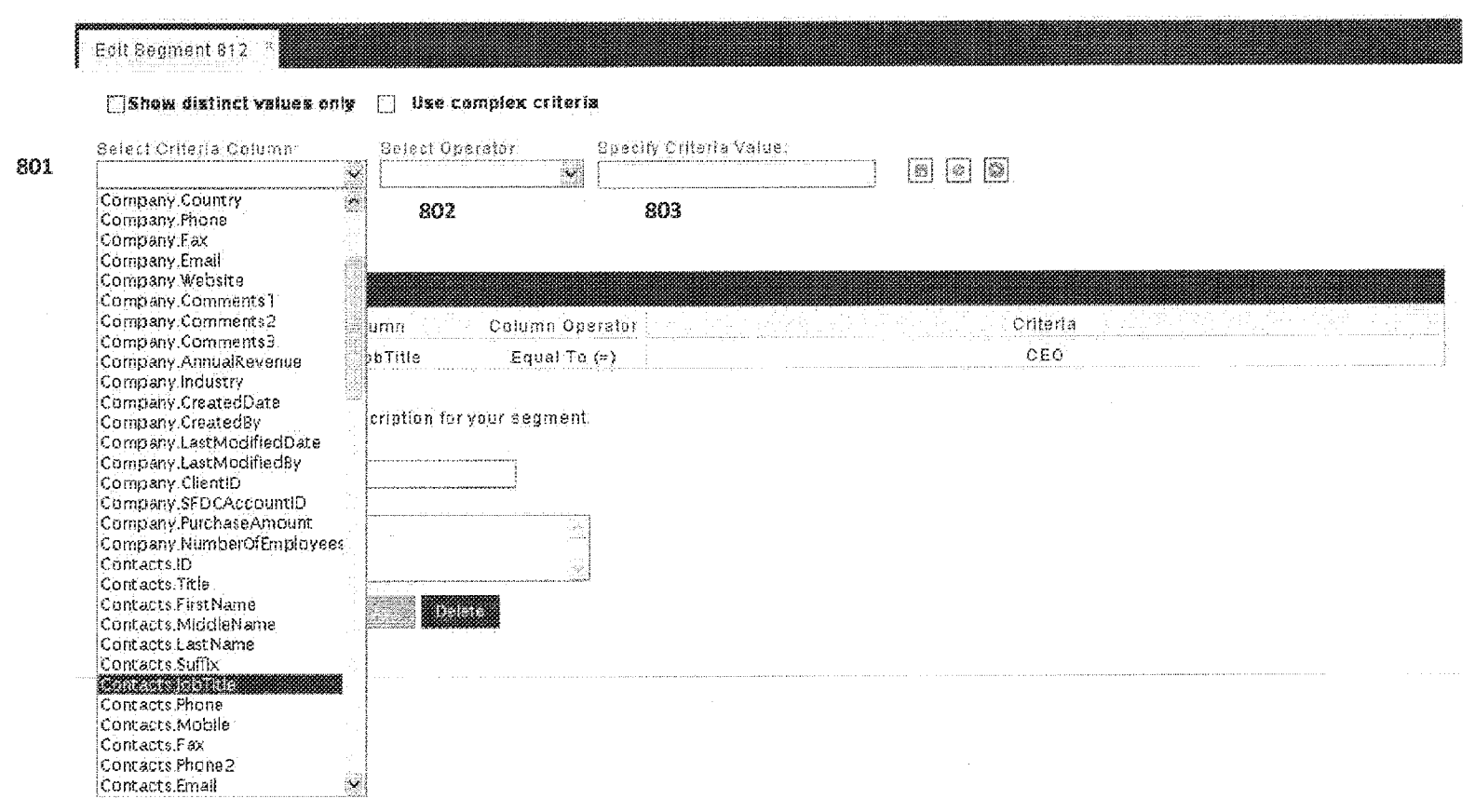
Figure 8B:
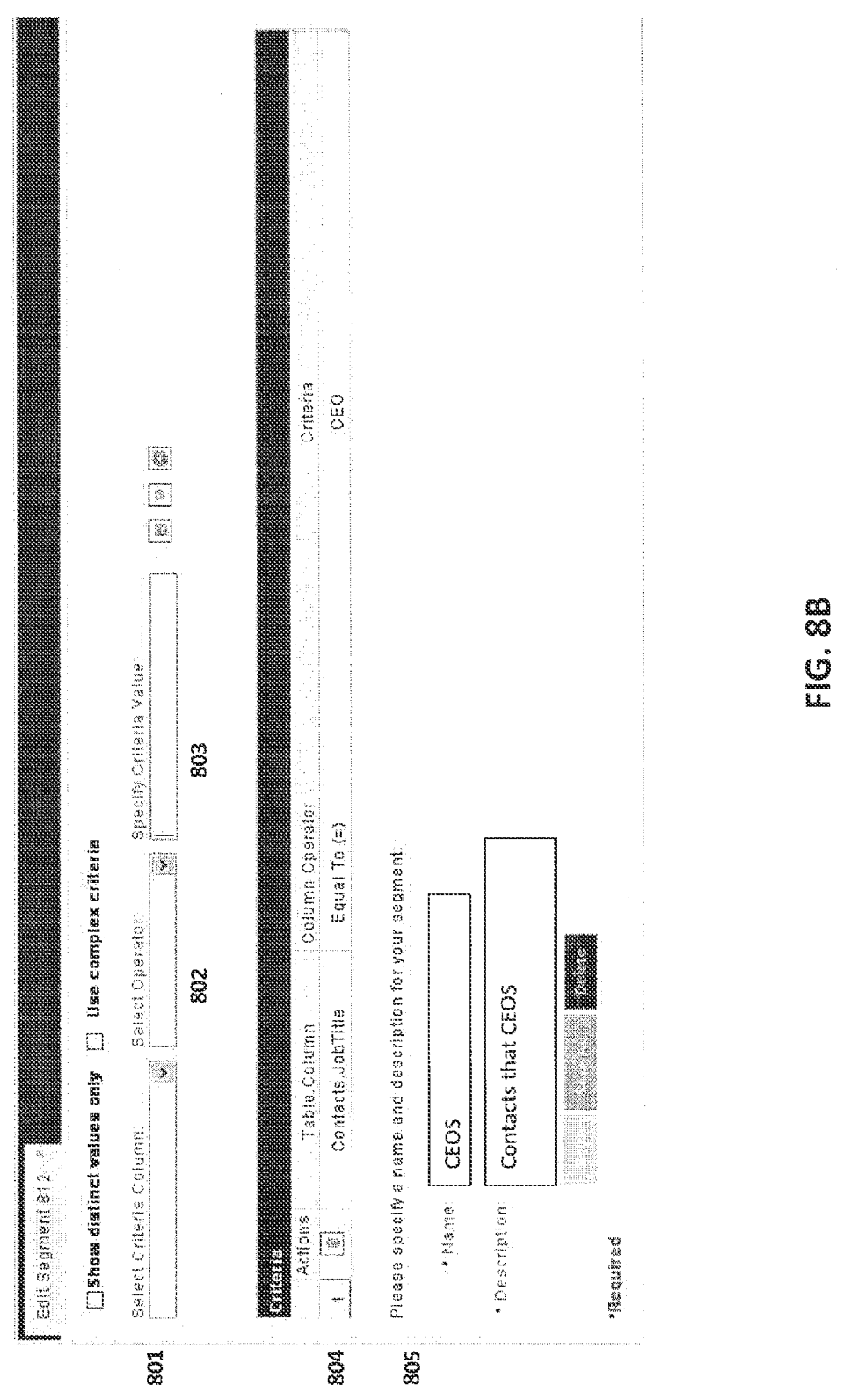

To set a granular or filtered option from all the stored Contact data as a selection from the drop down menu, such as "CEOs", the edit segment option 706 may be selected to take the user to a edit segment screen as shown in FIGS. 8A and 8B. For example, to set the "CEOs" option as a selectable segment, Criteria of Contacts.JobTitle was selected from a saved Criteria Column 801, as shown in FIG. 8A. A value (such as equal to) was selected from the Operator selection box 802 and the "CEO" Criteria Value was selected from Criteria Value box 803. The resulting formula is shown in box 804 of FIG. 8B. In box 805, a name and description for the created or edited segment may be specified. This description (i.e., "CEOs") is then displayed as a segment selection option for selection from the drop down menu selection 705A and 705B (FIGS. 7A and 7B, respectively). The created or edited segment data may be saved or deleted as desired.

Such data may also be textually displayed on associated tables. As an example, a user may wish to retrieve information in the Initiate Stage of FIG. 3 as to which of the Contacts work in organizations with more than 1000 employees. The user may further opt to select data from the amalgamated chart so to focus on attributes of one contact in general. For example, if two of three Contacts in the Initiate Stage work for large corporations having more than 1000 employees, the user may want to see individual information regarding the attributes of each of those Contacts, such as their positions in their respective organizations. The system may further be able to graphically analyze and display follow up steps, or tactics, associated with each of those Contacts to assist with progressing them to the next Stage.

Figure 2A:
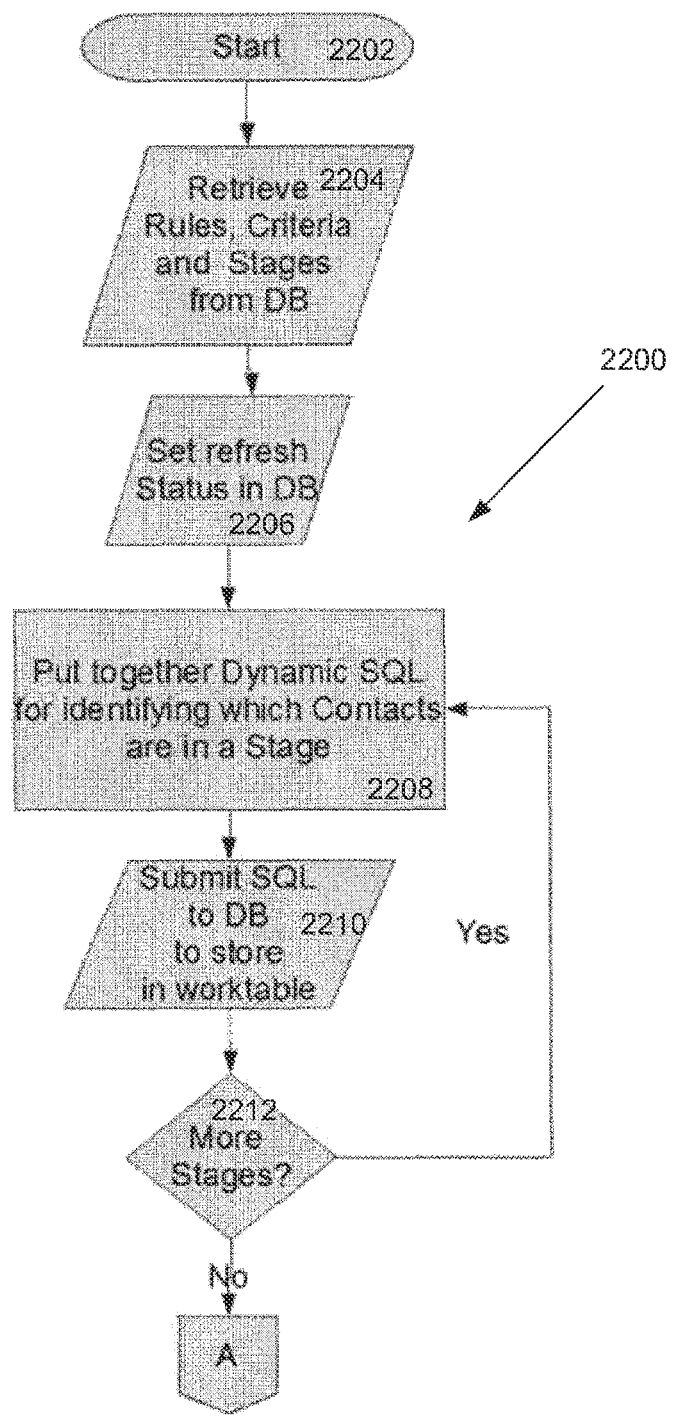
FIGS. 2A-C are flow chart diagrams of the algorithm to calculate the Lifecycle Map™ marketing chart according to one embodiment of the present invention.
Figure 2B:
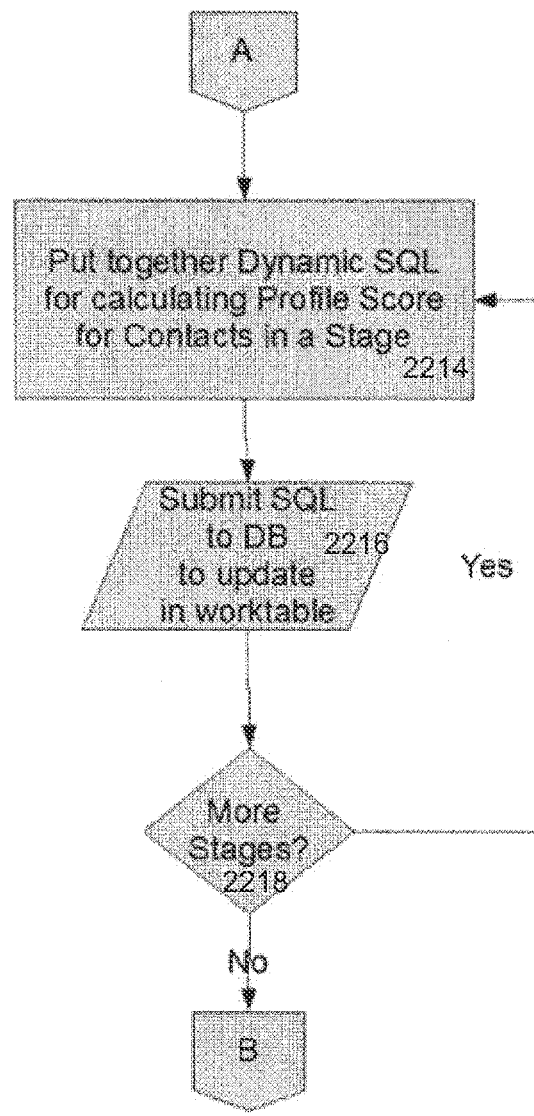
Figure 2C:
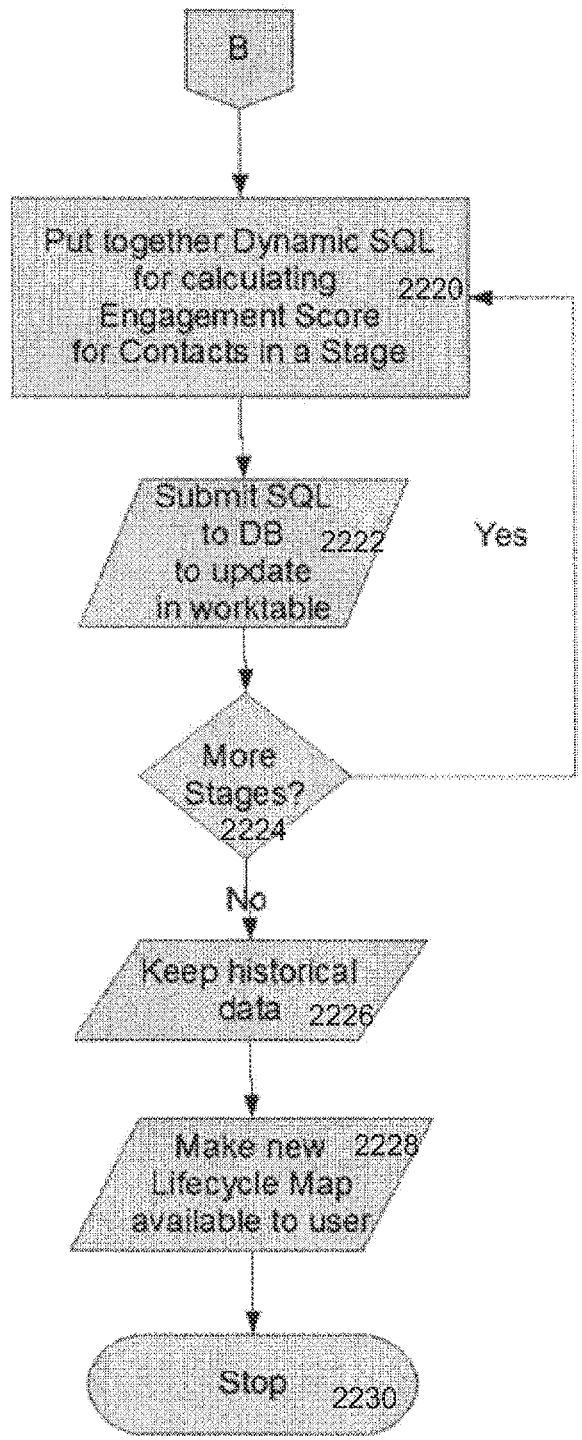

FIGS. 2A-2C show a flow chart diagram of the operation of system 100. Referring to FIG. 2A, process 2200 starts at 2202 where then the Rules, Criteria, and Stages for a particular customer are retrieved from the Shared Database Area 102, or "DB", in step 2204, and the refresh status is set in the DB step 2206. The refresh status is a flag that indicates to other parts of the system that the calculation of the Lifecycle Map™ marketing chart is in process. This allows the UI, for example, to show a warning to the user and inform them in advance that the Lifecycle Map™ marketing chart is in flux. Based on the customer's parameters retrieved in step 2204, system 100 dynamically creates SQL queries in step 2208 for identifying Contacts in a particular Stage, and stores the results of the queries in a worktable in step 2210. Steps 2208 and 2210 repeat for every Stage until no more Stages are determined in step 2212. Step 2214 dynamically creates SQL queries for calculating a Profile Score™ evaluation for Contacts in a particular Stage, and in step 2216 stores the result of this query in a worktable storable in the DB. Steps 2214 and 2216 repeat until all Stages have been resolved, and when no further Stages are available step 2218 dictates that system 100 proceed to calculating the Engagement Score™ evaluation. Thus in step 2220, system 100 dynamically creates SQL queries for calculating the Engagement Score™ evaluation for Contacts in a particular Stage, stores the results of the queries in a worktable in step 2222, and repeats steps 2220 and 2222 until no more Stages are available in step 2224. Once the various Stages have been resolved, historical data is saved in step 2226. Next, the calculated items are used to create a new Lifecycle Map™ marketing chart (see FIG. 3) for graphically expressing the state of the marketing efforts for the various Contacts of the customer. Once the new Lifecycle Map™ marketing chart is created, the process stops at step 2230.

In one embodiment, system 100 calculates Stages and Scores as follows as part of the process illustrated in FIGS. 2A-C: (1) obtain information about all the Stages from Stages table; (2) insert row into Status table showing that refresh is in process; (3) create a new working table to hold Contacts by Stage; (4) for each Stage (the goal in this loop is to figure out Contacts in each Stage) performing the following: (a) put together the INSERT part of the INSERT statement, (b) put together SELECT part of the INSERT statement, (c) convert Gate Criteria XML in to SQL statement; add a clause to the Gate Criteria XML to exclude Contacts that already belong to a previous Stage, and put (a), (b) and (c) together to get a fully formed SQL statement, and (d) send the SQL down to the database to execute Dynamic SQL Statement:

```
INSERT INTO [<<MyData>>].StageContacts
(StageID, ContactID, EngagementScore, ProfileScore, AsOf, CreatedBy,
CreatedDate, LastModifiedBy, LastModifiedDate, ClientID)
SELECT <<CurrentRow.StageID>>, Contacts.ID, 0, 0, GetDate( ),
<<UserRunningSchedule>>, GetDate( ), <<UserRunningSchedule>>,
GetDate( ),
<<CurrentRow.ClientID>>
FROM [<<MyData>>].Contacts
JOIN [<<MyData>>]......... (Gate Criteria XML converted to SQL
Statement) [AND] Contacts.ID NOT IN (SELECT ContactID FROM
[<<MyData>>].StageContacts);
```

(5) for each Stage (the goal in this loop is to calculate the Profile Score), perform the following: (a) obtain the XML for the rules of the Profile Score™ evaluation for the current Stage, (b) convert each line of the rule in to a SQL Statement, (c) send the SQL down to database to execute Dynamic SQL Statements; (6) for each Stage (the goal in this loop is to calculate the Engagement Score™ evaluation) perform the following: (a) obtain the XML for the rules of the Engagement Score™ evaluation for the current Stage, (b) for each communication device, look in the database table that stores communication activity, performing the following: (i) identify the number of attempted touch-points for each of the Contacts, (ii) identify the total of responses, (iii) convert each line of the rule in to a SQL Statement, (iv) send the SQL down to database to execute Dynamic SQL Statements; (7) now with the calculations being complete, data may be copied over to the History table; and (8) make work table the live table and insert row into Status table showing that refresh is complete, along with current date and time stamp.

System 100 may further calculate and display to the user a Lifecycle Churn Rate™ evaluation. This evaluation provides insight into the growth or decline of Contacts in a Stage as well as the average length of time in a Stage. It is the number of constituents who exit a Stage divided by the average number of total constituents in a Stage, for any given period of time.

Figure 3:
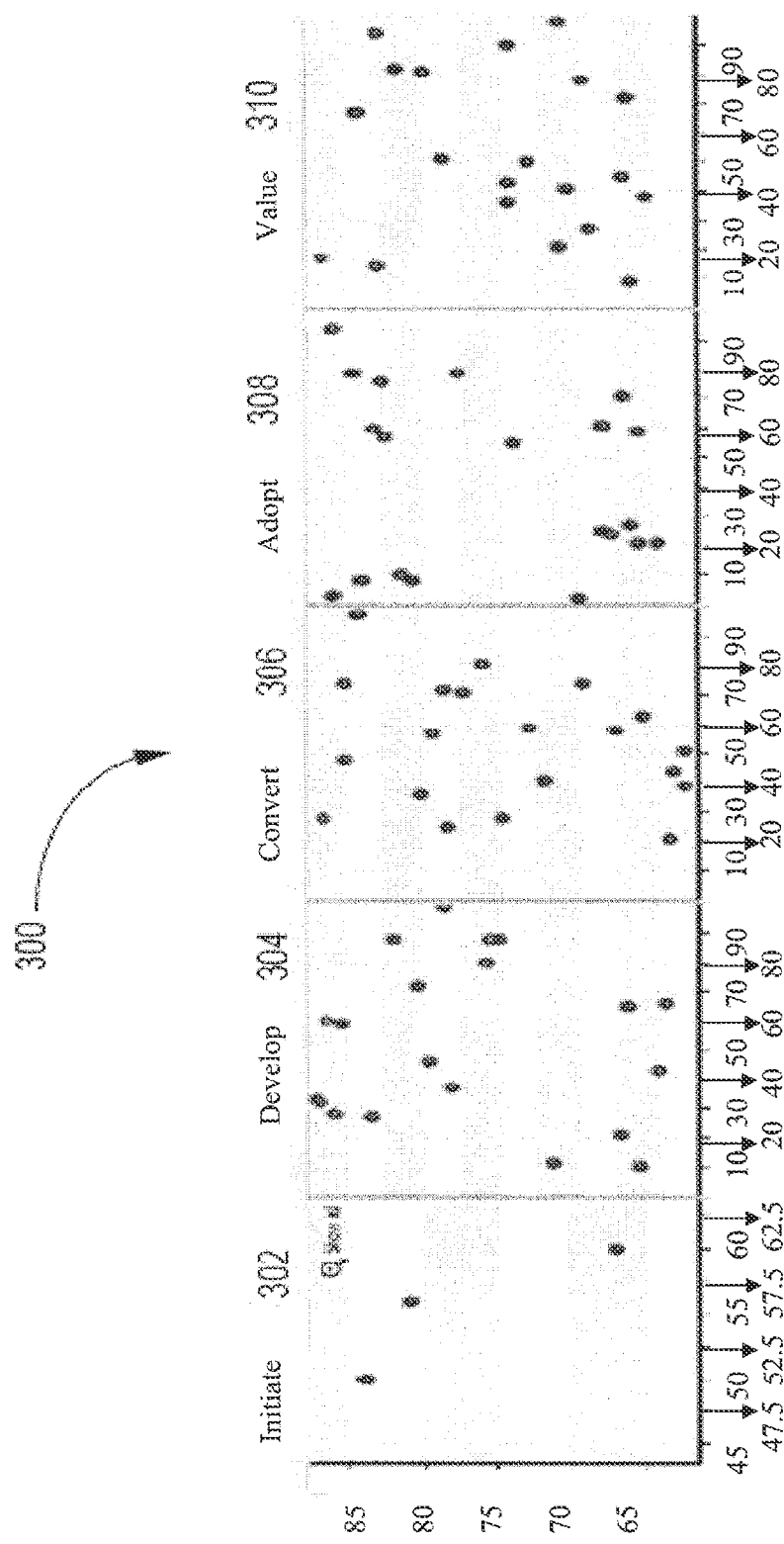
FIG. 3 is a schematic diagram of an embodiment of a Lifecycle Map™ marketing chart according to the present invention.

FIG. 3 shows an exemplary Lifecycle Map™ marketing chart according to one embodiment of the present invention. Chart 300 has, in this embodiment, five discrete areas, Initiate 302, Develop 304, Convert 306, Adopt 308, and Value 310. This chart is setup by a marketer that has determined that their prospects and customers go through five stages in the lifecycle with the company. In the first stage, called Initiate, the marketer has identified a prospect but knows little about the prospect. Once the marketer has nurtured a relationship with the prospect and the prospect has shown certain buying signals the prospect is move to the next stage. This next stage is called Develop and this is where the marketer further nurtures a relationship with the prospect until the prospect is ready to buy. At this point the prospect is moved to the Convert stage and a sales person takes over as the primary point of contact while the marketer continues to nurture the relationship using automated communications. When the prospect does buy the product, the prospect is now a customer and enters the Adopt stage. In this stage the marketer is making sure to keep the product in front of the customer so that customer adopts the product. Finally when the customer has gone through the implementation of the product, the customer has entered the final Value stage. The marketer must ensure the customer sees value in using the product in order to retain the customer at annual renewal time, and also to up sell other features or products from the company.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A server for providing remote users a Lifecycle marketing system based on information in a data store of the customer enterprise, said server comprising:
    a database storing customer enterprise data;
    query software capable of accessing data in the data store; and
    lifecycle definition software accessing the database and capable of creating a life cycle framework based on information on contacts included in the data store;
    wherein the lifecycle definition software creates the life cycle framework for a contact by determining a profile score for the contact by comparing attributes of the contact to a plurality of attributes of an ideal profile, determining a level of engagement of the contact by comparing interactions with the contact to a plurality of interaction types, and mapping the profile score and the level of engagement to a plurality of stages through which contacts may advance in a relationship with the customer enterprise;
    wherein the lifecycle definition software includes a first user interaction module that enables a user to define the plurality of attributes of the ideal profile and, for each of the plurality of attributes, to assign a weighting factor to the attribute, the plurality of attributes and associated weighting factors being stored in the database as customer enterprise data.

2. The server of claim 1 wherein the lifecycle definition software includes a second user interaction module that enables a user to define the plurality of interaction types, each corresponding to a mode of communication with a contact, and, for each of the plurality of interaction types, to assign a weighting factor to the interaction type, the plurality of interaction types and associated weighting factors being stored in the database as customer enterprise data.

3. The server of claim 2 wherein the lifecycle definition software includes a third user interaction module that enables a user to define the plurality of stages and, for each stage, to define a gate criteria that must be satisfied for a contact to advance to another stage, the plurality of stages and the associated gate criteria being stored in the database as customer enterprise data.

4. The server of claim 1 wherein said database includes customer enterprise data of a plurality of customer enterprises, said lifecycle definition software being capable of separating said customer enterprise data in said database and restricting access to each of said plurality of customer enterprises.

5. The server of claim 1 wherein said lifecycle definition software includes a history table for storing frameworks in said database.

6. The server of claim 5 wherein said query software stores at least some of the results of queries in said history table.

7. The server of claim 1 wherein said lifecycle definition software is used to display the life cycle framework to a user on a display.

8. A method of using a computer to provide remote users a customer Lifecycle management system based on information in a data store of the customer enterprise, the method comprising:

providing a user interface, the user interface enabling a user to enter customer enterprise data;

querying enterprise data stores regarding customer enterprise data; and creating a lifecycle framework for a contact based on the customer enterprise data and the results of the querying step by determining a profile score for the contact by comparing attributes of the contact to a plurality of attributes of an ideal profile, determining a level of engagement of the contact by comparing interactions with the contact to a plurality of interaction types, and mapping the profile score and the level of engagement to a plurality of stages through which contacts may advance in a relationship with the customer enterprise;

further comprising receiving from the user via the user interface the plurality of attributes of the ideal profile and, for each of the plurality of attributes, receiving an assigned weighting factor;

and storing the plurality of attributes and the associated weighting factors in a database as customer enterprise data.

9. The method of claim 8 further comprising receiving from the user via the user interface the plurality of interaction types, each corresponding to a mode of communication with a contact, and, for each of the plurality of interaction types, a weighting factor; and storing the plurality of interaction types and the associated weighting factors in the database as customer enterprise data.

10. The method of claim 9 further comprising receiving from the user via the user interface the plurality of stages and, for each stage, a gate criteria that must be satisfied for a contact to advance to another stage; and storing the plurality of stages and the associated gate criteria in the database as customer enterprise data.

11. The method of claim 8 wherein the database includes customer enterprise data of a plurality of customer enterprises stored with restricted access to each of the plurality of customer enterprises.

12. The method of claim 8 wherein the querying step includes dynamically constructing queries of the enterprise data stores.

13. The method of claim 12 wherein the querying step includes dynamically constructing SQL queries.

14. The method of claim 8 wherein the creating step includes creating a history table for storing frameworks.

15. The method of claim 14 wherein the querying step includes storing at least some of the results of queries in the history table.

16. The method of claim 8 further comprising displaying the life cycle framework to the user.

* * * * *